United States Patent
Kawase et al.

(10) Patent No.: US 6,207,605 B1
(45) Date of Patent: Mar. 27, 2001

(54) HIGH SILICA CONTENT ZEOLITE-BASED CATALYST

(75) Inventors: Masatsugu Kawase; Kouji Nomura; Yukito Nagamori; Jiro Kinoshita, all of Kurashiki (JP)

(73) Assignee: Sanyo Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 08/905,409

(22) Filed: Aug. 4, 1997

(51) Int. Cl.⁷ .................................................. B01J 29/04
(52) U.S. Cl. ........................ 502/85; 502/60; 502/63; 502/64; 502/66; 502/74; 585/417; 585/419
(58) Field of Search ................................ 502/60, 63, 64, 502/66, 67, 74, 85; 585/417, 419

(56) References Cited

U.S. PATENT DOCUMENTS

| | | | |
|---|---|---|---|
| 4,128,504 | * 12/1978 | Plank et al. | 252/455 Z |
| 4,326,994 | * 4/1982 | Haag et al. | 585/407 |
| 4,330,435 | * 5/1982 | Bertolacini et al. | 252/455 Z |
| 4,346,021 | * 8/1982 | Ball et al. | 252/431 N |
| 4,485,184 | * 11/1984 | Hettinger, Jr. et al. | 502/67 |
| 4,543,347 | * 9/1985 | Heyward et al. | 502/61 |
| 4,618,594 | * 10/1986 | Tait et al. | 502/66 |
| 5,128,293 | * 7/1992 | Shum | 502/61 |
| 5,151,259 | * 9/1992 | Blom | 423/328 |
| 5,234,873 | * 8/1993 | Basset et al. | 502/66 |

FOREIGN PATENT DOCUMENTS

| | | |
|---|---|---|
| 46-10064 | 3/1971 | (JP). |
| 56-49850 | 11/1981 | (JP). |
| 3-193622 | 8/1991 | (JP). |
| 3-293031 | 12/1991 | (JP). |
| 7-35343 | 4/1995 | (JP). |
| 7-29948 | * 4/1995 | (JP). |
| 7-94396 | 10/1995 | (JP). |
| 7-291620 | 11/1995 | (JP). |

OTHER PUBLICATIONS

Nippon Kagaku Kaisha, No. 3, pp. 303–306 (Mar. 1990).

* cited by examiner

Primary Examiner—Steven P. Griffin
Assistant Examiner—Cam N. Nguyen
(74) Attorney, Agent, or Firm—Birch, Stewart, Kolasch & Birch, LLP

(57) ABSTRACT

A high silica content zeolite-based catalyst for use in a reaction which uses a feedstock containing an aromatic hydrocarbon or which gives a product containing an aromatic hydrocarbon, which catalyst satisfies the following requirements (1), (2), (3) and (4): (1) the zeolite constituting a zeolite-based catalyst has an $SiO_2/Al_2O_3$ molar ratio of from 20 to 200; (2) the zeolite constituting a zeolite-based catalyst has a primary particle diameter of from 0.3 to 3 $\mu$m; (3) when a zeolite-based catalyst is converted into H type, the H type zeolite-based catalyst has a ratio of the number of surface acid sites to the total number of acid sites is from 0.03 to 0.15; and (4) a zeolite-based catalyst exhibits a pyridine-desorbed amount (B) as measured at a temperature of from 500° C. to 900° C. by a hot desorption method when converted into H type after being subjected to a steam treatment at an $H_2O$ partial pressure of 0.8 atm and a temperature of 650° C. for 5 hours, and a pyridine-desorbed amount (A) as measured at a temperature of from 500° C. to 900° C. by a hot desorption method when converted into H type without the steam treatment, which amounts satisfy the following requirements:

$\alpha \leq 1.6$ $\alpha = \left(\dfrac{1}{B^2} - \dfrac{1}{A^2}\right) \div 5 \times 10^5.$

18 Claims, 8 Drawing Sheets

HIGH SILICA CONTENT ZEOLITE-BASED CATALYST

FIELD OF THE INVENTION

The present invention relates to a high silica content zeolite-based catalyst for use in a reaction which uses a feedstock containing an aromatic hydrocarbon or provides a product containing an aromatic hydrocarbon. More particularly, the present invention relates to a high silica content zeolite-based catalyst having excellent regeneration deterioration resistance and coking resistance so that the amount of carbon materials accumulated on the catalyst during a reaction which uses a feedstock containing an aromatic hydrocarbon or provides a product containing an aromatic hydrocarbon is reduced, temporary activity drop due to carbon materials is inhibited, and permanent activity deterioration of the catalyst by dealumination in a high temperature atmosphere having water content as that occurred in the combustion and elimination of carbon materials with an oxygen-containing inert gas can be inhibited.

BACKGROUND OF THE INVENTION

Heretofore, methods for the synthesis of a high silica content zeolite and high silica content zeolites prepared by the methods have been known. For example, JP-B-46-10064 (The term "JP-B" as used herein means an "examined Japanese patent publication") and JP-B-56-49850 disclose a method which comprises the hydrothermal treatment of a reaction mixture containing silica, alumina, an alkaline metal, water and a source of organic nitrogen cation precursor.

Further, methods for the preparation of a high hot water resistance and high silica content zeolite and high silica content zeolites prepared by the methods have been known. For example, JP-A-7-291620 (The term "JP-A" as used herein means an "unexamined published Japanese patent application") discloses a high silica content zeolite having a high percent ion exchange and an excellent resistance to hot water, as compared to conventional high silica content zeolites, which comprises long hexagonal plate crystal particles having a major axis/minor axis ratio of from 2 to 15 and a major axis/thickness ratio of from 4 to 50 in a proportion of not less than 75% by number, and which has a percent crystal retention of not less than 85% when subjected to steaming treatment at 900° C. for 5 hours, obtained by hydrothermally treating an aluminosilicic acid gel having a pH value of from 11 to 13 prepared by simultaneously pouring a silica component and an alumina component into an aqueous solution of a neutral salt in an amount of not less than 7.5 mol per mol of alumina component and a process for the preparation of the high silica zeolite.

Further, JP-A-3-293031 discloses a high heat resistance zeolite having an oxide molar composition of $aK_2O$, $bNa_2O$, $Al_2O_3$, $cSiO_2$ and $dH_2O$ which exhibits a crystallinity, as measured after hot water treatment at 900° C. for 5 hours in steam having a water content of not less than 10%, which is not less than 90% in comparison with that as measured before the heat treatment, and also discloses a process for the preparation thereof.

Further, JP-A-3-193622 discloses a process for the preparation of particulate ZSM-5 which comprises crystallizing a mixture of feedstocks containing silica source, alumina source, alkaline metal source and water under hydrothermal synthesis conditions, characterized in that as a seed slurry there is added before crystallization a hydrothermally synthesized half-crystallized slurry in an amount of from 10 to 40% by weight based on the total weight thereof, in which the slurry has a nitrogen adsorption BET surface area of from 100 to 250 m$^3$/g, the solid matter contained in the slurry shows an X-ray diffraction pattern of ZSM-5 after dried.

Further, JP-B-7-35343 and JP-B-7-94396 disclose a process for the preparation of an aromatic hydrocarbon from a light hydrocarbon in the presence of an ZSM-5 type zeolite containing zinc as a catalyst, characterized in that the catalyst has a specific silicon/aluminum atomic ratio and zinc/silicon atomic ratio and allows the desorption of pyridine in an amount of from 40 to 120 μmol per g of the ZSM-5 type zeolite at a temperature of from 500° C. to 900° C. by hot desorption method.

However, the high silica content zeolite synthesized by the method described in JP-B-46-10064 and JP-B-56-49850 is disadvantageous in that it has an insufficient crystallinity and hence gives a crystal having a poor heat resistance, causing permanent deterioration of zeolite catalyst by deluminization in a high temperature atmosphere having water content as that occurred in the combustion and elimination of carbon materials accumulated during the reaction. The high silica content zeolite is also disadvantageous in that a large amount of carbon materials are accumulated thereon during the reaction, so that a large-sized apparatus for combusting and eliminating the carbon materials is necessitated.

The zeolite synthesized by the method disclosed in JP-A-7-291620 and JP-A-3-293031 has a high hot water resistance. However, these patent publications have no reference to the use of the zeolite in a reaction which uses a feedstock containing an aromatic hydrocarbon or which provides a product containing an aromatic hydrocarbon. The problem of activity drop by carbon materials accumulated on the zeolite catalyst during the reaction is not recognized in these publications.

Further, zeolite needs to have a raised crystallinity to raise its hot water resistance. Eventually, such zeolite tends to have a large particle diameter. Such zeolite having a large particle diameter has a small ratio of the number of surface acid sites to the total number of acid sites. Thus, the activity drop due to carbon materials accumulated on the zeolite catalyst during a reaction which uses a feedstock containing an aromatic hydrocarbon or which provides a product containing an aromatic hydrocarbon is accelerated, making it impossible to put such zeolite into practical use.

The zeolite synthesized in JP-A-3-193622 is a particulate zeolite for use in the reaction to produce cyclohexanol from cyclohexene as described in the examples thereof. In this publication, minimization of the particle diameter of zeolite is intended to achieve. Thus, zeolite having a small particle diameter is described in the examples. However, in a reaction which uses a feedstock containing a component which causes an increase of the accumulation of carbon materials, or which reaction gives a product containing such a component, such as the reaction system of the present invention, if the particle diameter of the zeolite is too small, the amount of carbon materials accumulated during the reaction is raised. When the accumulated amount of carbon materials is raised, the time required for the combustion and elimination of carbon materials is prolonged, as compared with the case where the accumulated amount of carbon materials is less, if the same apparatus for the combustion and elimination of carbon materials is used. If the combustion is effected for the same period of time, a larger combustion apparatus is required. In addition, the amount of water content produced per unit time is raised, to thereby accelerate permanent deterioration due to dealuminization. Further, ZSM-5 disclosed in JP-A-3-193622 has a small crystallinity and hence a low hot water resistance that accelerates permanent deterioration of zeolite catalyst due to dealuminization in a high temperature atmosphere having water content.

JP-B-7-35343 and JP-B-7-94396 disclose a process for the preparation of an aromatic hydrocarbon from a light hydrocarbon, characterized in that a catalyst having a specific silicon/aluminum atomic ratio and zinc/silicon atomic ratio and containing a ZSM-5 type zeolite which allows the desorption of pyridine in an amount of from 40 to 120 μmol per g of the ZSM-5 type zeolite at a temperature of from 500° C. to 900° C. by hot desorption method is used, to minimize the activity drop with time due to carbon materials accumulated during the reaction. By predetermining the desorbed amount of pyridine to the above defined range, the activity drop with time due to carbon materials accumulated can be minimized while maintaining the activity required for the production of an aromatic hydrocarbon from a light hydrocarbon. However, these publications give no solutions to the problem of permanent deterioration of the zeolite catalyst due to dealumination in a high temperature atmosphere having water content as that occurred in the combustion and elimination of carbon materials accumulated on the catalyst during the reaction. In any of these publications, as can be seen in the examples, the parameter α represented by the amount (B) of pyridine desorbed from the catalyst at a temperature of from 500° C. to 900° C. by a hot desorption method when the catalyst is converted into H type after being subjected to a steam treatment at an $H_2O$ partial pressure of 0.8 atm and a temperature of 650° C. for 5 hours, and the amount (A) of pyridine desorbed from the catalyst at a temperature of from 500° C. to 900° C. by a hot desorption method when converted into H type without the steam treatment, is larger than 1.6. Thus, the deterioration due to deposition of carbon materials for every reaction is reduced. However, these catalysts are liable to rapid permanent deterioration. Thus, these catalysts cannot be practically used for several months or several years in repeating reaction and regeneration by combustion and elimination of carbon materials accumulated during the reaction.

As described above, various methods for the synthesis of zeolite have been proposed. However, no high silica content zeolite-based catalysts have been found excellent in both coking resistance and regeneration deterioration resistance wherein the amount of carbon materials accumulated on the catalyst during a reaction which uses a feedstock containing an aromatic hydrocarbon or which provides a product containing an aromatic hydrocarbon are reduced, temporary activity drop due to carbon materials is inhibited, and permanent activity deterioration of the catalyst due to dealumination in a high temperature atmosphere having water content as that occurred in the combustion and elimination with an oxygen-containing inert gas of the carbon materials is inhibited.

SUMMARY OF THE INVENTION

It is therefore an object of the present invention to provide a high silica content zeolite catalyst excellent in both coking resistance and regeneration deterioration resistance in which the amount of carbon materials accumulated on the catalyst during a reaction which uses a feedstock containing an aromatic hydrocarbon or which provides a product containing an aromatic hydrocarbon is reduced, temporary activity drop due to carbon materials is inhibited, and permanent activity deterioration of the catalyst due to dealumination in a high temperature atmosphere having water content as that occurred in the combustion and elimination with an oxygen-containing inert gas of the carbon materials is inhibited.

Other objects and effects of the present invention will become apparent from the following descriptions.

The inventors made extensive studies to solve the foregoing problems. As a result, it was found that all the foregoing problems can be solved by the use of a zeolite-based catalyst having a specific $SiO_2/Al_2O_3$ molar ratio, a specific particle diameter, a specific acid site ratio and specific number of acid sites as a high silica content zeolite-based catalyst for use in a reaction which uses a feedstock containing an aromatic hydrocarbon or which gives a product containing an aromatic hydrocarbon. Thus, the present invention has been completed.

That is, the above objectives of the present invention have been achieved by providing a high silica content zeolite-based catalyst for use in a reaction which uses a feedstock containing an aromatic hydrocarbon or which gives a product containing an aromatic hydrocarbon, which catalyst satisfies the following requirements (1), (2), (3) and (4):

(1) the zeolite constituting the zeolite-based catalyst has an $SiO_2/Al_2O_3$ molar ratio of from 20 to 200;

(2) the zeolite constituting the zeolite-based catalyst has a primary particle diameter of from 0.3 to 3 μm;

(3) when the zeolite-based catalyst is converted into H type, the H type zeolite-based catalyst has a ratio of the number of the surface acid sites to the total number of acid sites thereof is from 0.03 to 0.15; and (4) the zeolite-based catalyst exhibits a pyridine-desorbed amount (B) as measured at a temperature of from 500° C. to 900° C. by a hot desorption method when converted into H type after being subjected to a steam treatment at an $H_2O$ partial pressure of 0.8 atm and a temperature of 650° C. for 5 hours, and a pyridine-desorbed amount (A) as measured at a temperature of from 500° C. to 900° C. by a hot desorption method when converted into H type without the steam treatment, which amounts satisfy the following requirements:

$$\alpha \leq 1.6$$

$$\alpha = \left(\frac{1}{B^2} - \frac{1}{A^2}\right) \div 5 \times 10^5$$

DETAILED DESCRIPTION OF THE INVENTION

Figure 1:
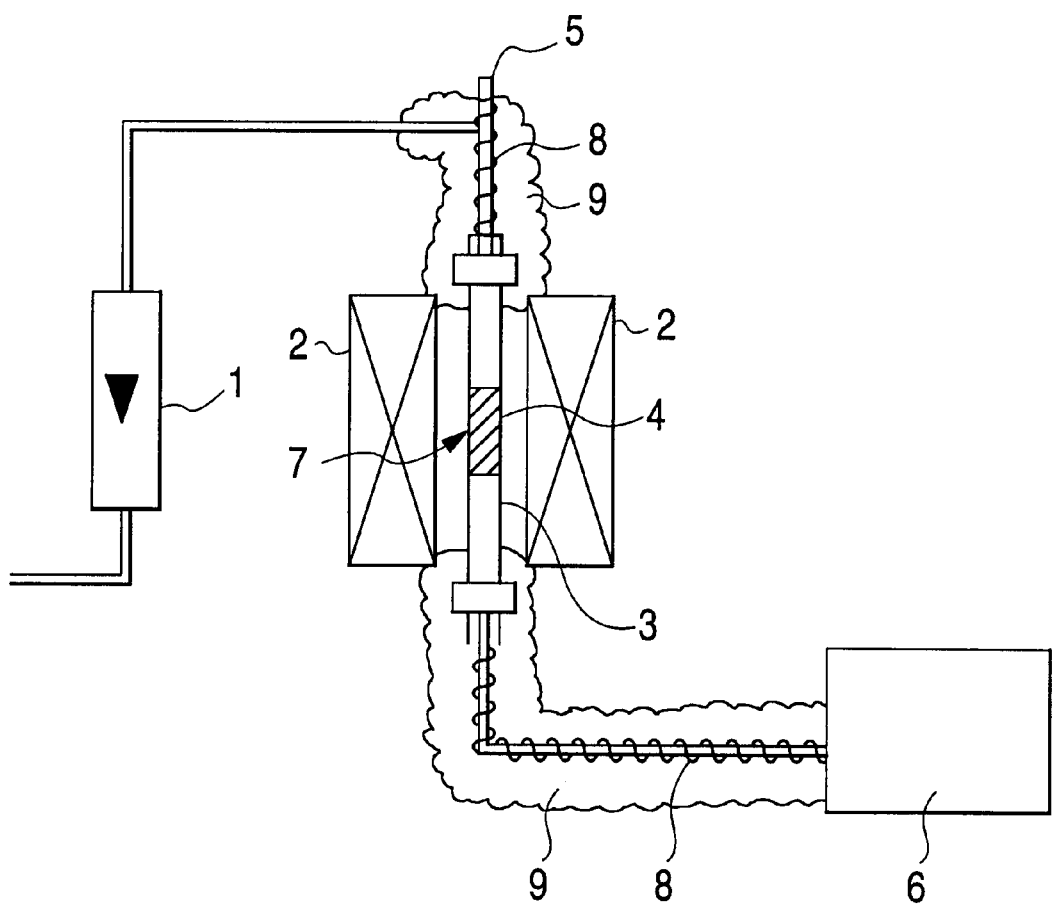
FIG. 1 is a schematic diagram of an acid site measuring apparatus for use in the process of the present invention.

The words "reaction which uses a feedstock containing an aromatic hydrocarbon or which provides a product containing an aromatic hydrocarbon" as used herein means a reaction which uses a feedstock containing an aromatic hydrocarbon in an amount of not less than 5% by weight or which provides a product containing an aromatic hydrocarbon in an amount of not less than 5% by weight. If aromatic hydrocarbon components, particularly such as styrene, are contained in the feedstocks or reaction product, a large amount of carbon materials are accumulated during the reaction. Examples of the reaction which uses a feedstock containing an aromatic hydrocarbon or which provides a product containing an aromatic hydrocarbon include cyclization reaction for the production of an aromatic hydrocarbon from a light hydrocarbon containing an olefin and/or a paraffin, catalytic cracking reaction for efficiently producing lower olefins and aromatic hydrocarbons from hydrocarbon-containing feedstocks such as naphtha and H-NGL in such a manner that lower olefins comprising ethylene as a main component are obtained in a higher yield than aromatic hydrocarbons, disproportionation reaction of toluene, isomerization reaction of xylene, and synthesis reaction of ethylbenzene.

Among these reactions, the cyclization reaction for producing an aromatic hydrocarbon from a light hydrocarbon containing an olefin and/or a paraffin is described below in more detail.

The words "light hydrocarbon containing an olefin and/or a paraffin" as used herein means a hydrocarbon having 2 or more carbon atoms and a 90% distillation temperature of not higher than 190° C. Examples of the paraffin include ethane, propane, butane, pentane, hexane, heptane, octane, and nonane. Examples of the olefin include ethylene, propylene, butene, pentene, hexene, heptene, octene, and nonene. In addition to these components, the light hydrocarbon may contain naphthanes or naphthenes such as cyclopentane, cyclopentene, methyl cyclopentane, cyclohexane, methyl cyclopentene, cyclohexene and cyclohexadiene. The light hydrocarbon may also contain dienes such as butadiene, pentadiene and cyclopentadiene.

A mixture of the above described compounds may be used as a feedstock. The mixture may contain as a diluent an inert gas such as $N_2$, $CO_2$ and CO or may contain $H_2$ or $CH_4$ to inhibit the production of carbon materials (coke) which are accumulated on the catalyst with the progress of the reaction. Further, it is particularly preferred that the weight ratio of saturated hydrocarbons to unsaturated hydrocarbons in the mixture be from 0.43 to 2.33. The term "weight ratio of saturated hydrocarbons to unsaturated hydrocarbons" as used herein means the weight ratio in the mixture as supplied.

Examples of the above described mixture include a mixture of the above described compounds, $C_4$ distillates of high temperature pyrolysis product of a petroleum hydrocarbon such as naphtha, distillates obtained by removing butadiene or butadiene and i-butene from the $C_4$ distillate, $C_5$ distillates of high temperature pyrolysis product, distillates obtained by removing dienes from the $C_5$ distillate, pyrolysis gasoline, raffinates obtained by extracting aromatic hydrocarbons from pyrolysis gasoline, FCC-LPG, FCC decomposition gasoline, raffinates obtained by extracting aromatic hydrocarbons from reformate, coker's LPG, and straight-run naphtha. Particularly preferred among these compounds are $C_4$ and $C_5$ distillates of high temperature pyrolysis product of petroleum hydrocarbon such as naphtha, and distillates obtained by removing a part or whole of butadiene, i-butene, isoprene and cyclopentadiene from the $C_4$ and $C_5$ distillates. In particular, feedstocks having a weight ratio of $C_4$ distillate to $C_5$ distillate of from 3/7 to 7/3 are preferred. The language "weight ratio of $C_4$ distillate to $C_5$ distillate" as used herein means the weight ratio in the mixture as supplied. In the method of the present invention, the feedstocks may contain as impurities oxygen-containing compounds such as TBA and methanol.

The zeolite constituting the high silica content zeolite-based catalyst of the present invention has an $SiO_2/Al_2O_3$ molar ratio of from 20 to 200. Examples of such a zeolite include β-zeolite, Ω-zeolite, Y-zeolite, L-zeolite, erionite, offretite, mordenite, ferrierite, ZSM-5, ZSM-8, ZSM-11, ZSM-12, ZSM-35 and ZSM-38. Preferred among these zeolites are ZSM-5 type crystalline alumino- or metallo-silicates such as ZSM-5, ZSM-8 and ZSM-11. For the details of ZSM-5, reference can be made to U.S. Pat. No. 5,268,162.

The zeolite for use in the present invention may be used as H type or metal-substituted type zeolite. The metal substitution used herein includes both an ion exchange and a framework substitution. Preferred examples of metal in the metal-substituted type zeolite include the group VIII, Ib, IIb and IIIb metals. Preferred examples of the group VIII, Ib, IIb and IIIb metals include Zn, Cu, Ag, Ni, Pt, Pd and Ga. Particularly preferred among these metals are Zn, Ag, Ni and Ga. These metals may be contained in the zeolite framework or may be taken into the zeolite by ion exchange.

Further, the zeolite for use in the present invention may be used in combination with a binder such as alumina and/or a metal oxide for accelerating dehydrogenation such as zinc oxide, as described below.

Examples of the method for adjusting (1) $SiO_2/Al_2O_3$ molar ratio, (2) diameter of primary particles of zeolite, (3) ratio of the number of surface acid sites to the total number of acid sites when the zeolite-based catalyst is rendered of H type and (4) parameter α, within the predetermined range of the present invention are described below.

The $SiO_2/Al_2O_3$ molar ratio can be adjusted by controlling the $SiO_2/Al_2O_3$ molar ratio of the feedstocks charged. The diameter of primary particles of zeolite can be adjusted by controlling synthesis conditions such as stirring speed and synthesis temperature and the $SiO_2/Al_2O_3$ molar ratio of the feedstocks charged. The ratio of the number of surface acid sites to the total number of acid sites in the H type zeolite-based catalyst depends on the particle diameter and crystalline form. The crystalline form of zeolite can be adjusted by selecting the presence or absence of templates in synthesis or the kind of the templates, or by controlling the composition of the feedstocks such as $SiO_2/Al_2O_3$ molar ratio and water content. Further, the particle diameter and crystalline form are important factors for obtaining a zeolite having a large relative crystallinity (i.e., small non-crystalline amorphous content), i.e., a zeolite having a parameter α within the range required in the present invention.

Examples of the crystalline form include sphere, hexagonal plate, long hexagonal plate, cube and ellipsoid. In particular, zeolites having a crystalline form such as hexagonal plate, long hexagonal plate and ellipsoid, obtained by the use of a seed slurry or the like and without using template are preferred from the standpoint of the ratio of the number of surface acid sites to the total number of acid sites of the H type zeolite-based catalyst or parameter α.

As long as these requirements are satisfied, the synthesis method of the zeolite for use in the present invention is not particularly limited. A synthesis method which uses a seed slurry or seed crystal as described in JP-A-3-193622 is particularly preferred. As described above, JP-A-3-193622 is intended to reduce the particle diameter. All ZSM-5 described in the examples of this publication have a small particle diameter. It is thus presumed that dealuminization in a high temperature atmosphere having water content as that occurred in the combustion and elimination of carbon materials accumulated during the reaction causes permanent deterioration of the zeolite catalyst and gives a large parameter α value. Accordingly, if the method described in JP-A-3-193622 is used to synthesize the zeolite for use in the present invention, it is necessary that the diameter of primary particles and parameter α of the zeolite be adjusted within the predetermined range of the present invention by raising the $SiO_2/Al_2O_3$ molar ratio of the feedstocks charged or like methods, as well as raising the $SiO_2/Al_2O_3$ molar ratio of the zeolite and the ratio of the number of surface acid sites to the total number of acid sites of the H type zeolite-based catalyst. The $SiO_2/Al_2O_3$ molar ratio of the feedstocks charged is properly adjusted depending on the desired $SiO_2/Al_2O_3$ molar ratio of the resulting catalyst.

In the method of the present invention, a zeolite which has an intermediate pore diameter, is substantially free of proton, has an $SiO_2/Al_2O_3$ molar ratio of not less than 20 and contains one or more group Ib metals, as described in International Patent Application No. PCT/JP95/02040 may be used.

The zeolite constituting the catalyst of the present invention has an $SiO_2/Al_2O_3$ molar ratio of from 20 to 200, preferably from 30 to 100, more preferably from 30 to 80. If the $SiO_2/Al_2O_3$ molar ratio falls below 20, the permanent activity deterioration of the catalyst due to dealumination in a high temperature atmosphere having water content, as that occurred in the combustion and elimination, with an oxygen-containing inert gas, of carbon materials accumulated on the catalyst during the reaction which uses a feedstock containing an aromatic hydrocarbon or which provides a product containing an aromatic hydrocarbon, is accelerated. It is considered that the permanent activity deterioration can be inhibited in higher degree when the relative crystallinity as determined by X-ray diffractometry is higher. The relative crystallinity is affected by the $SiO_2/Al_2O_3$ molar ratio. If the $SiO_2/Al_2O_3$ molar ratio falls below 20 or exceeds 200, the relative crystallinity is reduced, to thereby accelerate the permanent activity deterioration due to dealuminization. Further, if the $SiO_2/Al_2O_3$ molar ratio exceeds 200, a sufficient activity cannot be achieved. Thus, the resulting catalyst may become not active enough for the reaction which uses a feedstock containing an aromatic hydrocarbon or which provides a product containing an aromatic hydrocarbon.

The $SiO_2/Al_2O_3$ molar ratio of the zeolite constituting the catalyst of the present invention is determined by subjecting a hydrothermally synthesized fresh zeolite which is free of a binder such as alumina and silica, and which is not yet subjected to dealuminization treatment such as steaming or to reaction for producing an aromatic hydrocarbon from a light hydrocarbon, to measurement by a fluorescent X-ray apparatus.

The zeolite-based catalyst of the present invention may be one substantially composed of zeolite of the above described H type or metal-substituted type. The zeolite-based catalyst of the present invention preferably comprises a mixture of the above described zeolite and at least one selected from the group consisting of the group VIII, Ib, IIb and IIIb metals and compounds thereof (e.g., metal oxide which accelerates dehydrogenation such as zinc oxide) incorporated therein or supported thereon as a compound.

Preferred examples of the group VIII, Ib, IIb and IIIb metals include Zn, Cu, Ag, Ni, Pt, Pd and Ga. Particularly preferred among these metals are Zn, Ag, Ni and Ga. In particular, the zeolite-based catalyst of the present invention preferably comprises a mixture of zeolite and at least one selected from the group consisting of zinc and compounds thereof. More preferably, the zeolite-based catalyst of the present invention further comprises, as a binder, alumina or silica.

Examples of the zinc component for use in the present invention include zinc, zinc oxide, zinc hydroxide, zinc salts such as zinc nitrate, zinc carbonate, zinc sulfate, zinc chloride, zinc acetate and zinc oxalate, and organic zinc compounds such as alkyl zinc.

In the present invention, the zeolite-based catalyst preferably comprises a mixture of zeolite, zinc component and alumina. The zeolite-based catalyst of the present invention is also preferably a mixture of zeolite with a heat-treated mixture of zinc component and alumina in steam. In any of these catalysts, a zinc component reacts with alumina when steamed, to produce zinc aluminate, which is a stabilized form of zinc. Accordingly, the zeolite-based catalyst of the present invention can drastically reduce the fly loss of zinc in the reaction for producing an aromatic hydrocarbon from a light hydrocarbon containing an olefin and/or a paraffin in a high yield. The term "zinc aluminate" as used herein means one having the same X-ray diffraction pattern as described in JCPDS 5-0669 NBS Circ., 539, Vol. II, 38 (1953) when observed by an X-ray diffractometer such as XD-610 (available from Shimadzu Corp.).

Examples of an alumina source include anhydrous or hydrous alumina. Besides these materials, materials which can undergo hydrolysis, pyrolysis, oxidation or the like to produce anhydrous or hydrous alumina, such as aluminum salts, may be used.

In the present invention, alumina sol may also be preferably used as an alumina source. If alumina sol is used as an alumina source, the zinc component and alumina can be reacted to produce zinc aluminate, which is a stabilized form of zinc, even if the above described steaming is not effected.

In the above described zeolite-based catalyst, the content of at least one selected from the group consisting of zinc and compounds thereof is preferably from 5 to 25% by weight as calculated in terms of zinc.

In the case where the zeolite-based catalyst of the present invention contains alumina, the content thereof is generally from 5 to 50% by weight, preferably from 15 to 40% by weight as calculated in terms of $Al_2O_3$ based on the total weight of the catalyst. If the zeolite-based catalyst of the present invention contains alumina and zinc, the molar ratio of alumina to zinc ($Al_2O_3$/Zn) is generally not less than 1.

In the present invention, the zeolite-based catalyst preferably comprise zinc oxide and zinc aluminate in combination at the time of reaction. Zinc aluminate has a spinnel structure. Thus, the fly of zinc from the zeolite-based catalyst can be inhibited. However, the effect of enhancing the selectivity of aromatic group, which is an original purpose of supporting on zinc, is reduced. Accordingly, the zeolite-based catalyst preferably comprises zinc oxide, which can exert an effect of enhancing the selectivity of aromatic group, in combination with zinc aluminate. The optimum content of zinc oxide and zinc aluminate at the time of the reaction, which uses a feedstock containing an aromatic hydrocarbon or which provides a product containing an aromatic hydrocarbon, are from 1.2 to 20% by weight and from 8.2 to 50% by weight, respectively, and preferably from 1.0 to 5.0% by weight and from 14 to 40% by weight, respectively.

The effect provided zinc aluminate per se in enhancing the aromatic group selectivity is small. However, zinc aluminate acts as a source of zinc oxide and hence inhibit the reduction of zinc oxide. As a result, zinc aluminate is capable of maintaining the effect of enhancing the selectivity of aromatic group over an extended period of time. Further, the presence of zinc aluminate also exerts an effect of minimizing the rate of fly of zinc oxide by reduction during the reaction which uses a feedstock containing an aromatic hydrocarbon or which provides a product containing an aromatic hydrocarbon. Therefore, the coexistence of zinc oxide and zinc aluminate in the catalyst is effective for maintaining the effect of enhancing the aromatic group selectivity.

The term "zinc oxide" as used herein means one identified by the following analysis. That is, 1 g of the catalyst is ground down to some hundreds of micrometers by means of a mortar, and then dried at a temperature of 120° C. for 1 hour. About 0.5 g of the thus ground catalyst is weighed out, and then charged into a 200 cc beaker. To the catalyst is then added 150 cc of a 3% aqueous solution of hydrochloric acid. The mixture is then heated to a temperature of 80° C. over an electric heater for 2 hours. Thereafter, the mixture is filtered through a 0.2 $\mu$m membrane filter. The filtrate is then subjected to flame analysis by an atomic-absorption spectrometer (Type AA-640-12 atomic-adsorption/flame spectrophotometer, available from Shimadzu Corp.) and subjected to quantitative analysis of zinc oxide by standard addition method.

In the present invention, the weight of zinc aluminate is obtained by subtracting the weight of zinc oxide obtained by the above described quantitative analysis from the total weight of zinc. The term "total weight of zinc" as used herein means the value determined on the calibration curve of the standard substance measured by a fluorescent X-ray analyzer (Rigaku RIX1000).

The zeolite-based catalyst of the present invention preferably has a pore volume of not less than 0.2 cc/g-catalyst, more preferably not less than 0.3 cc/g-catalyst. The term "pore volume" used herein means a pore volume as measured by a Hg porosimeter such as Porosimeter 2000 manufactured by Carlo Erba. When the zeolite-based catalyst is a simple substance of a zeolite having no super cage, such as ZSM-5, the volume of pores of the zeolite itself having a pore radius size of not more than 200 Å is measured. In other words, only micro pores are observed. On the other hand, when the zeolite-based catalyst is composed of a zeolite and a binder such as alumina and silica, macro pores having a pore radius size of not less than 200 Å are also observed in addition to micro pores. The macro pores are attributed to voids between the zeolite particle and the binder particle. In the present invention, the "pore volume" represents the sum of both the micro pore volume and the macro pore volume. If the pore volume is less than 0.2 cc/g-catalyst, the pores tend to be blanked off by carbon materials accumulated on the catalyst during a reaction, to thereby accelerate deterioration due to coking.

In the present invention, the diameter of primary particles of zeolite is determined by observing a substantially fresh zeolite under a scanning electron microscope, as like in the determination of $SiO_2/Al_2O_3$ molar ratio. In the present invention, the particle diameter thus determined is preferably from 0.3 to 3 $\mu$m, more preferably from 0.5 to 2 $\mu$m. These primary particles may have various crystal forms. The term "particle diameter" as used herein means the average value of diameters measured at the widest portion of each particle. These primary particles may be present as it is or in the form of secondary particle. If the particle diameter falls below 0.3 $\mu$m, the amount of carbon materials accumulated on the catalyst during the reaction which uses a feedstock containing an aromatic hydrocarbon or which provides a product containing an aromatic hydrocarbon is raised. In addition, the permanent activity deterioration of the catalyst due to dealumination in a high temperature atmosphere having water content, as that occurred in the combustion and elimination, with an oxygen-containing inert gas, of carbon materials accumulated on the catalyst during the reaction which uses a feedstock containing an aromatic hydrocarbon or which provides a product containing an aromatic hydrocarbon, is accelerated. On the contrary, if the particle diameter exceeds 3 $\mu$m, the temporary activity drop by carbon materials accumulated on the catalyst during the reaction which uses a feedstock containing an aromatic hydrocarbon or which provides a product containing an aromatic hydrocarbon is accelerated. The catalyst thus obtained cannot be put into practical use.

In the present invention, the ratio of the number of surface acid sites to the total number of acid sites of the zeolite-based catalyst measured when it is rendered of H type is preferably from 0.03 to 0.15, more preferably from 0.05 to 0.1 at the time when used in the above described reaction. If the ratio falls below 0.03, the temporary activity drop due to carbon materials accumulated on the catalyst during the reaction which uses a feedstock containing an aromatic hydrocarbon or which provides a product containing an aromatic hydrocarbon is accelerated. On the contrary, if the ratio exceeds 0.15, the amount of carbon materials accumulated on the catalyst during the reaction which uses a feedstock containing an aromatic hydrocarbon or which provides a product containing an aromatic hydrocarbon is raised. Furthermore, the permanent activity deterioration of the catalyst due to dealumination in a high temperature atmosphere having water content, as that occurred in the combustion and elimination, with an oxygen-containing inert gas, of carbon materials accumulated on the catalyst during the reaction which used a feedstock containing an aromatic hydrocarbon or which provides a product containing an aromatic hydrocarbon, is accelerated.

Figure 2:
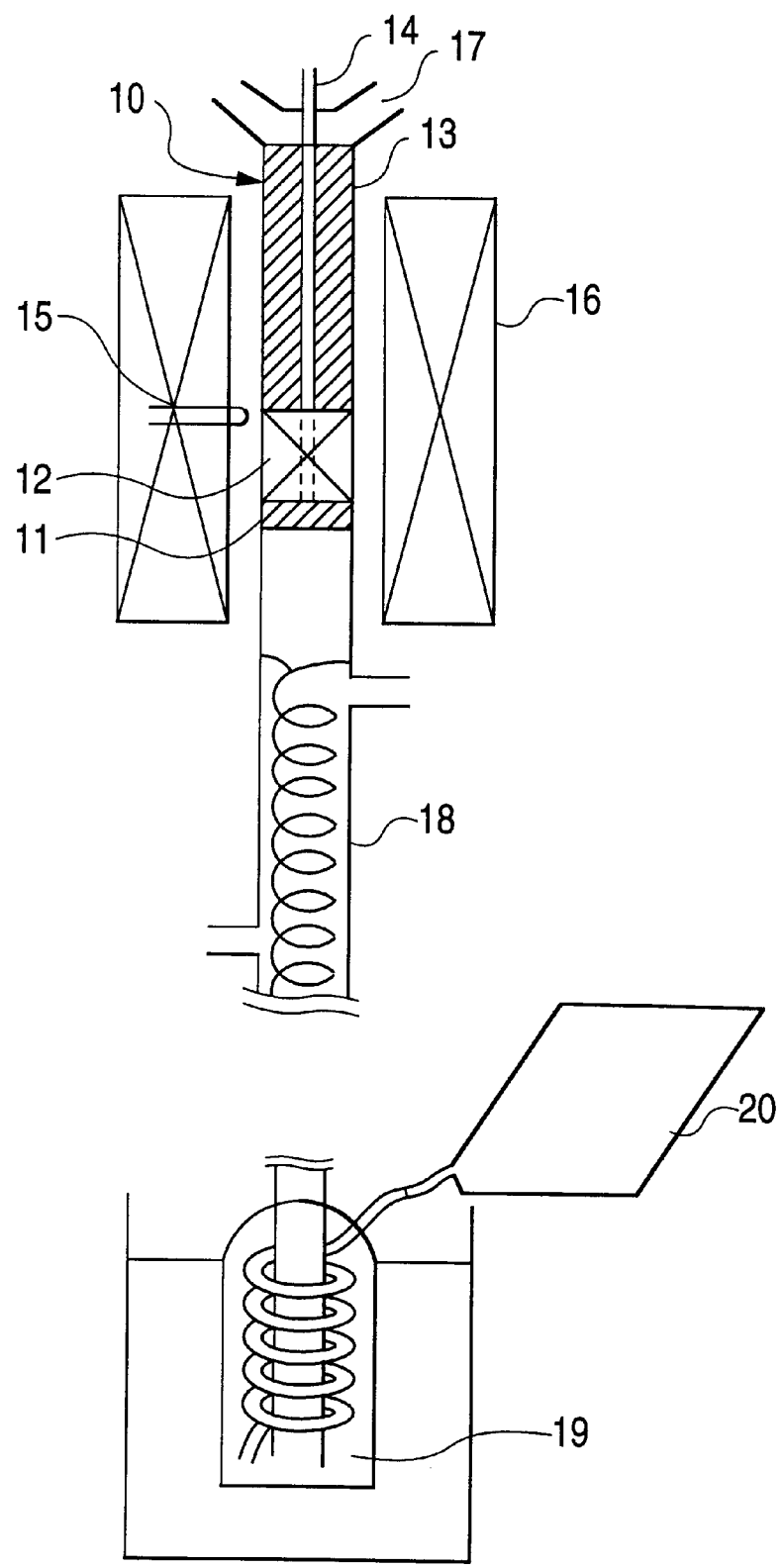
FIG. 2 is a schematic diagram of an isothermal type reaction apparatus for use in the process of the present invention.

In the present invention, the five hour steam treatment of the catalyst at a $H_2O$ partial pressure of 0.8 atm and a temperature of 650° C. may be effected by means of an apparatus shown in FIG. 2. In the operation, a 10 mm-diameter quartz reaction tube 10 is filled with a quartz wool 11, a catalyst 12 and a Raschig ring 13 in this order from the bottom. The quartz reaction tube 10 is then heated by an electric furnace 16 the temperature of which can be controlled by a temperature adjusting thermocouple 15 in such a manner that the catalyst 12 is isothermal at 650° C. as measured by a thermometer 14. Under these conditions, water or steam is supplied into the substantially fresh catalyst through a feedstock inlet 17 at atmospheric pressure and an $H_2O$ partial pressure of 0.8 atm for 5 hours.

In the present invention, the parameter α represented by the following expressions, assuming that (B) is the amount of pyridine desorbed from the zeolite-based catalyst at a temperature of from 500° C. to 900° C. by a hot desorption method as measured when the catalyst is converted into H type after being subjected to a steam treatment at an H$_2$O partial pressure of 0.8 atm and a temperature of 650° C. for 5 hours and (A) is the amount of pyridine desorbed from the zeolite-based catalyst at a temperature of from 500° C. to 900° C. by a hot desorption method as measured when the catalyst is converted into H type without being subjected to the steam treatment, is preferably not more than 1.6, particularly not more than 1.4.

$$\alpha \leq 1.6$$

$$\alpha = \left(\frac{1}{B^2} - \frac{1}{A^2}\right) \div 5 \times 10^5$$

If the parameter α is larger than 1.6, the permanent activity deterioration of the catalyst due to dealumination in a high temperature atmosphere having water content, as that occurred in the combustion and elimination, with an oxygen-containing inert gas, of carbon materials accumulated on the catalyst during the reaction which uses a feedstock containing an aromatic hydrocarbon or which provides a product containing an aromatic hydrocarbon, is accelerated and the resulting regeneration deterioration resistance is deteriorated.

The parameter α depends on the crystallinity determined by X-ray diffractometry. That is, as described in the comparative examples described below, if the particle diameter of zeolite is small as in Comparative Example 1, if the SiO$_2$/Al$_2$O$_3$ molar ratio is small as in Comparative Example 3, or if the SiO$_2$/Al$_2$O$_3$ molar ratio is large as in Comparative Example 4, the relative crystallinity determined by X-ray diffractometry is small, the parameter α is large, and the regeneration deterioration resistance is deteriorated. Even if the SiO$_2$/Al$_2$O$_3$ molar ratio and the particle diameter fall within the predetermined range of the present invention, the parameter α may become larger than 1.6, as in Comparative Example 5, to thereby deteriorate the regeneration deterioration resistance. In Comparative Example 5, a small relative crystallinity is given, and it is thus presumed that a non-crystalline amorphous coexists in the zeolite thus synthesized. Accordingly, it is necessary that all the requirements (1) to (4) of the present invention be satisfied to provide a catalyst which shows little permanent activity deterioration due to dealuminization in a high temperature atmosphere having water content and which can withstand repeated reaction/regeneration for several years.

The term "relative crystallinity" as used herein means the relative value of the sum of peak height at 2θ of 23.1°, 24.0° and 24.4° on X-ray diffraction pattern of a zeolite in the zeolite-based catalyst.

The desorbed amount of pyridine and the ratio of the number of surface acid sites to the total number of acid sites in the present invention are determined by the following methods.

(Method for the measurement of acid site)

Before the measurement of acid site, the zeolite-based catalyst, if it is not of H type, should be converted into H type by the following method. In order to convert a zeolite into H type, a 1 N sulfuric acid is added to the zeolite to form a 10 wt % slurry which is then subjected to ion exchange at a temperature of 60° C. for 4 hours. The slurry is filtered, washed with a five-fold amount of water, and then dried at a temperature of 120° C. for 10 hours. The H type zeolite thus obtained is then measured for acid site by the following method.

For the measurement of acid site, a Type GC-14A gas chromatography and a Type CR-4A data processor available from Shimadzu Corp. The apparatus for the measurement of acid site in the present invention is shown in FIG. 1. In the operation, a short SUS column 3 having an inner diameter of 6 mm and a total length of 220 mm is filled with a specimen 4 in an amount of from 0.1 to 1 g. The specimen 4 is used in a length of from 1 to 5 mm if it has been pelletized, or used after being compression-molded to from 20 to 30 meshes if it is in the form of powder. The temperature of a cylindrical electric furnace 2 having an inner diameter of 20 mm and a length of 150 mm is then adjusted to 180° C. in case that the amine used is pyridine, or adjusted to 280° C. in case that the amine used is 4-methylquinoline, while nitrogen is being allowed to flow as a carrier gas at a rate of 60 cc/min under the control of a gas flowmeter 1. Subsequently, amine (pyridine, 4-methylquinoline) is intermittently injected into the column 3 at a certain interval (2 to 5 minutes) through an inlet 5 by means of an auto sampler microsyringe (AOC) in a constant amount (1 μcc).

On the other hand, the carrier gas which has passed through the filled column 3 is then analyzed by an FID type detector 6 to obtain a chromatograph of the change of amine concentration with time in which peaks appear periodically. As the time of injection increases, the amount of amine adsorbed by the specimen comes close to saturation, accompanied by the increase of the amount of amine which is injected but is not adsorbed by the specimen. Accordingly, in the above described chromatograph, the peak area $S_i$ of the amount of amine which is injected but not adsorbed by the specimen gradually comes close to the area $S_o$ of the amount of injected amine. That is, the total counted number corresponding to the peak area $S_i$ confirmed by the data processor comes close to the total counted number corresponding to the area $S_o$ confirmed by the data processor. When the total counted number $N_i$ corresponding to the unabsorbed amount of amine determined at one injection time i and the total counted number $N_{i-1}$ corresponding to the unabsorbed amount of amine determined immediately before the injection time i satisfy the following requirement, it is regarded as that the adsorbed amount of amine is saturated:

$$N_i = (N_{i-1} \pm N_{1-1} \times 10)/100$$

Once it has been judged that saturated adsorption of amine by the catalyst is completed under the above described conditions, the column 3 is then heated at a rate of 15° C./min by the cylindrical electric furnace 2. The gas passage is heated by a ribbon heater 8 or the like between the periphery of the amine inlet 5 and the FID type detector 6 except inside the electric furnace. The area thus heated is covered with a heat insulating material 9. In this arrangement, the gas passage is kept at 200° C. in case that the amine used is pyridine, or at 300° C. in case that the amine used is 4-methylquinoline. The detection of temperature is effected at a temperature detection end 7 provided close to the exterior of the specimen tube. The amine separated from the specimen 4 until the temperature of the temperature detection end 7 reaches 900° C. is then detected by the FID type detector 6. Using the amine calibration curve, the desorbed amount of amine is then calculated.

The total number of acid sites as used herein is represented by the desorbed amount of pyridine which is used as an amine. The number of surface acid sites as used herein is represented by the desorbed amount of 4-methylquinoline which is used as an amine. The amount of pyridine desorbed at a temperature of 500° C. to 900° C. by hot desorption method represents an amount desorbed between the time at which the temperature of the temperature detection end 7 reaches 500° C. and the time at which the temperature of the temperature detection end 7 then reaches 900° C. The desorbed amounts are both represented per g of catalyst containing zeolite.

(Method for the measurement of the first order reaction rate constant of n-hexane decomposition)

For the measurement of the rate constant of first order reaction of n-hexane decomposition, the apparatus shown in FIG. 2 is used. In the operation, a 10 mm-diameter quartz reaction tube 10 is filled with a quartz wool 11, a catalyst 12 substantially free of coke, and a Raschig ring 13 in this order from the bottom. The quartz reaction tube 10 is then heated by an electric furnace 16 the temperature of which can be controlled by a temperature adjusting thermocouple 15 in such a manner that the catalyst 12 is isothermally heated as measured by a thermometer 14. In this arrangement, n-Hexane is then supplied into the reaction tube 10 through a feedstock inlet 17 at the atmospheric pressure and a weight-hour spatial velocity (WHSV) of 4 $hr^{-1}$. After 0.75 to 1 hour from the supply of n-hexane, the resulting reaction product is cooled in a condenser 18, and then cooled with a dry ice/ethanol coolant in an oil trap 19. Entire portions of the oil component separated in the oil trap 19 and the gas component separated in a generated gas collection bag 20 are collected, respectively. The composition of the gas component and the oil component are analyzed by a Type FID-TCD gas chromatography (HP-5890 Series II, available from Hewlet-Packard Corp.) and a Type FID gas chromatography (GC-17A, available from Shimadzu Corp.), respectively, to determine the percent conversion of n-hexane which is then substituted in the following equation to obtain the rate constant of first order reaction of n-hexane decomposition. The results are averaged over measurements made for 0.25 hours of collection of gas and oil components with zeolite as a standard.

of $n$-hexane decomposition $(sec^{-1})$ =

$$\frac{1}{\theta} \times \ln \frac{100}{100 - (\% \text{ conversion of } n\text{-hexane})}$$

where $\theta(sec)$ = volume of catalyst bed $(m^3)$/flow
rate of starting fluid material$(m^3/sec)$ conversion of $n$-hexane (%) =

$100 - (n - C_6 \text{ concentration in reaction product}) (\text{wt \%})$

The above described rate constant of first order reaction is a representative measure of the activity of the catalyst. The zeolite-based catalyst of the present invention preferably exhibits an n-hexane first order reaction rate constant of not less than 0.2, more preferably not less than 0.3 when it is used in the reaction. If the n-hexane first order reaction rate constant of the catalyst falls below 0.2, the resulting activity is too low to obtain a sufficient amount of the desired product in the reaction which uses a feedstock containing an aromatic hydrocarbon or which provides a product containing an aromatic hydrocarbon.

The present invention will be described in more detail with reference to the following Examples and Comparative Examples, but the present invention should not be construed as being limited thereto.

EXAMPLE 1

To a solution obtained by adding 0.05 kg of NaOH and 4 kg of $H_2O$ to 8.0 kg of an aqueous solution of sodium silicate ($SiO_2$: 26% by weight; $Na_2O$: 7.0% by weight) was added a solution obtained by dissolving 0.61 kg of $Al_2(SO_4)_3.16 H_2O$ and 0.1 kg of 1,3-dimethylurea in 15 kg of $H_2O$ with stirring. To the mixture was then added 10 kg of a 5 wt % sulfuric acid to obtain a homogeneous gel. The gel thus obtained was then charged into a 50-l autoclave. The gel was then allowed to undergo synthesis reaction at a temperature of 160° C. with stirring at a power of from 0.5 to 1 $kw/m^2$ for 10 hours to obtain a seed slurry.

Subsequently, to 6.44 kg of sodium silicate of special grade No. 3 ($SiO_2$: 25% by weight; $Na_2O$: 8% by weight, available from Fuji Chemical Industry Corp.) were added 17.47 kg of $H_2O$, 0.248 kg of $Al_2(SO_4)_3.16 H_2O$ (available from Wako Pure Chemical Industries, Ltd.) and 0.353 kg of sulfuric acid (purity: 97%, available from Wako Pure Chemical Industries, Ltd.). To the mixture was then added 10.49 kg of the above described slurry as a seed slurry to obtain a homogeneous gel. The gel thus obtained was charged into a 50-l autoclave where it was then stirred at a temperature of 150° C. and a rotary speed of 110 rpm for 45 hours to undergo crystallization.

Figure 3:
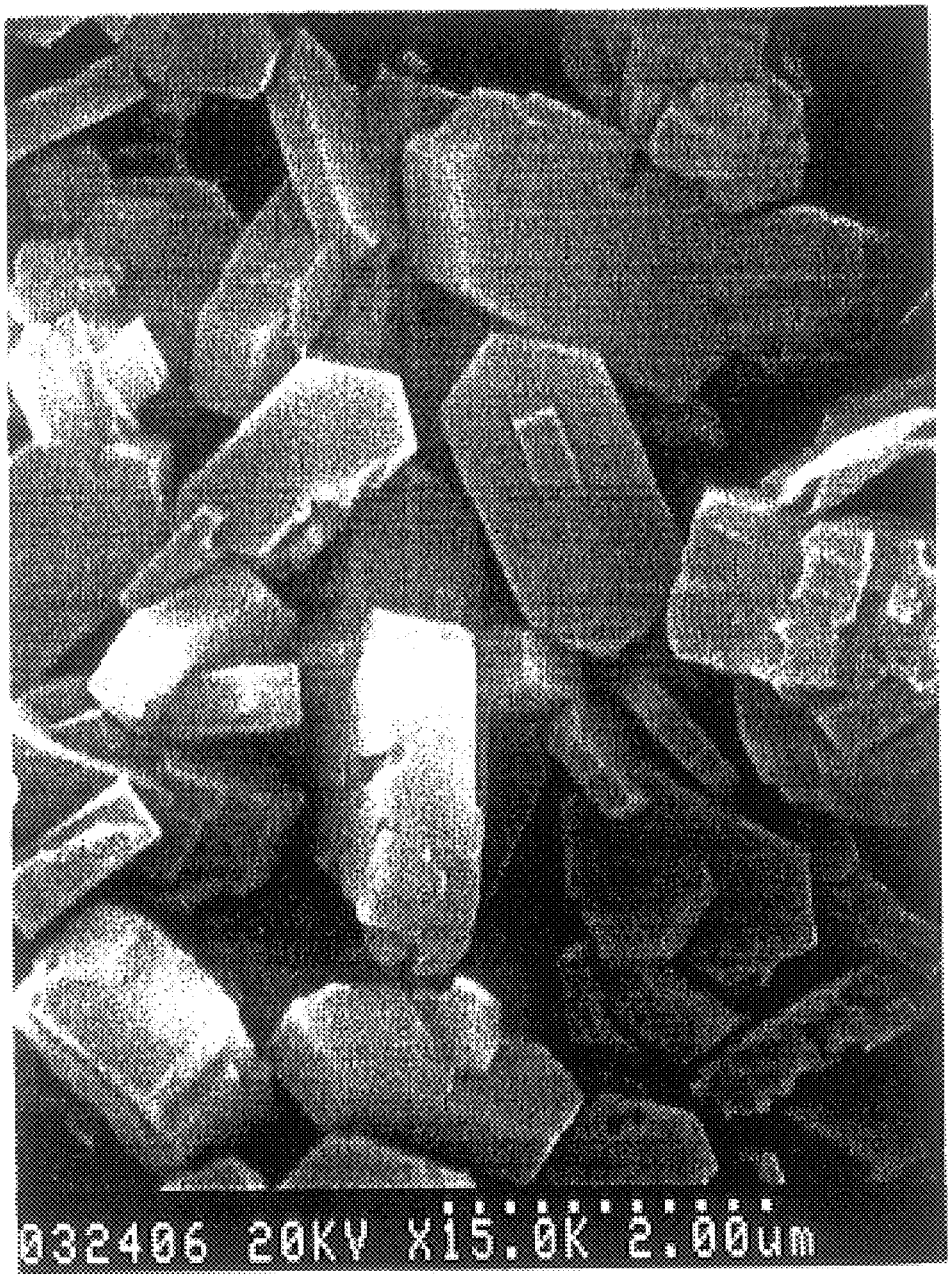
FIG. 3 is a scanning electron micrograph of the catalyst obtained in Example 1.

The slurry thus obtained was filtered, washed with a five-fold amount of water, and then dried at a temperature of 120° C. for 5 hours. A photograph of the dried matter taken by a scanning electron microscope is shown in FIG. 3. As can be seen in FIG. 3, the ZSM-5 thus produced has a thickness of from 1.5 to 2 $\mu$m at the widest section and an average thickness of 1.2 $\mu$m.

The dried matter was then measured for $SiO_2/Al_2O_3$ molar ratio by means of a fluorescent X-ray analyzer. The results were 36.

Further, the dried mater was subjected to ion exchange in a 10 wt % slurry in a 1-N sulfuric acid at room temperature for 3 hours, filtered, washed with a four-fold amount of water, and then dried at a temperature of 120° C. for 10 hours.

To a solution of 144 g of zinc nitrate hexahydrate in 400 g of water were then added 400 g of alumina sol (Alumina Sol 520, available from Nissan Chemical Industries, Ltd.) and 200 g of the above described H-ZSM-5. The mixture was then heated to a temperature of 50° C. with stirring for 2 hours. The mixture which had lost water content and become clay-like was molded into a cylinder shape having a diameter of 1.6 mm and a length of 4 to 6 mm, dried at a temperature of 120° C. for 2 hours, and then calcined at a temperature of 500° C. in an air atmosphere in an electric furnace for 3 hours to form an H-ZSM-5 zeolite catalyst having a zinc content of 10% by weight.

The molded catalyst thus obtained was then packed into the quartz reaction tube in the apparatus shown in FIG. 2. The catalyst was then subjected to treatment with steam at a temperature of 650° C. and an $H_2O$ partial pressure of 0.8 atm for 5 hours in accordance with the above described method. Using the above described method, the zeolite-based catalyst which had been converted into H type after or without being subjected to the above described steam treatment was measured for the amount of pyridine desorbed at a temperature of 500° C. to 900° C. by hot desorption method.

Subsequently, in order to make the initial activity of the catalyst equal to that of the catalysts of the examples and comparative examples described below, the catalyst was additionally subjected to treatment with steam at a temperature of 650° C. and an $H_2O$ partial pressure of 0.8 atm for 1.2 hours in accordance with the above described method. The catalyst thus treated with steam was then measured for the rate constant of first order reaction of n-hexane and for the ratio of the number of surface acid sites to the total number of acid sites in accordance with the above described method.

In order to evaluate the regeneration deterioration resistance of the catalyst, a model regeneration deterioration test was effected. That is, the above described catalyst which had been subjected to steam treatment for 6.2 hours in total was packed into the apparatus shown in FIG. 2 where it was then additionally subjected to treatment with steam at a temperature of 530° C. and an $H_2O$ partial pressure of 0.15 atm for 100 hours. The catalyst was measured for the rate constant of first order reaction of n-hexane before and after this steam treatment in the same manner as described above. The results are shown in Table 1.

Figure 4:
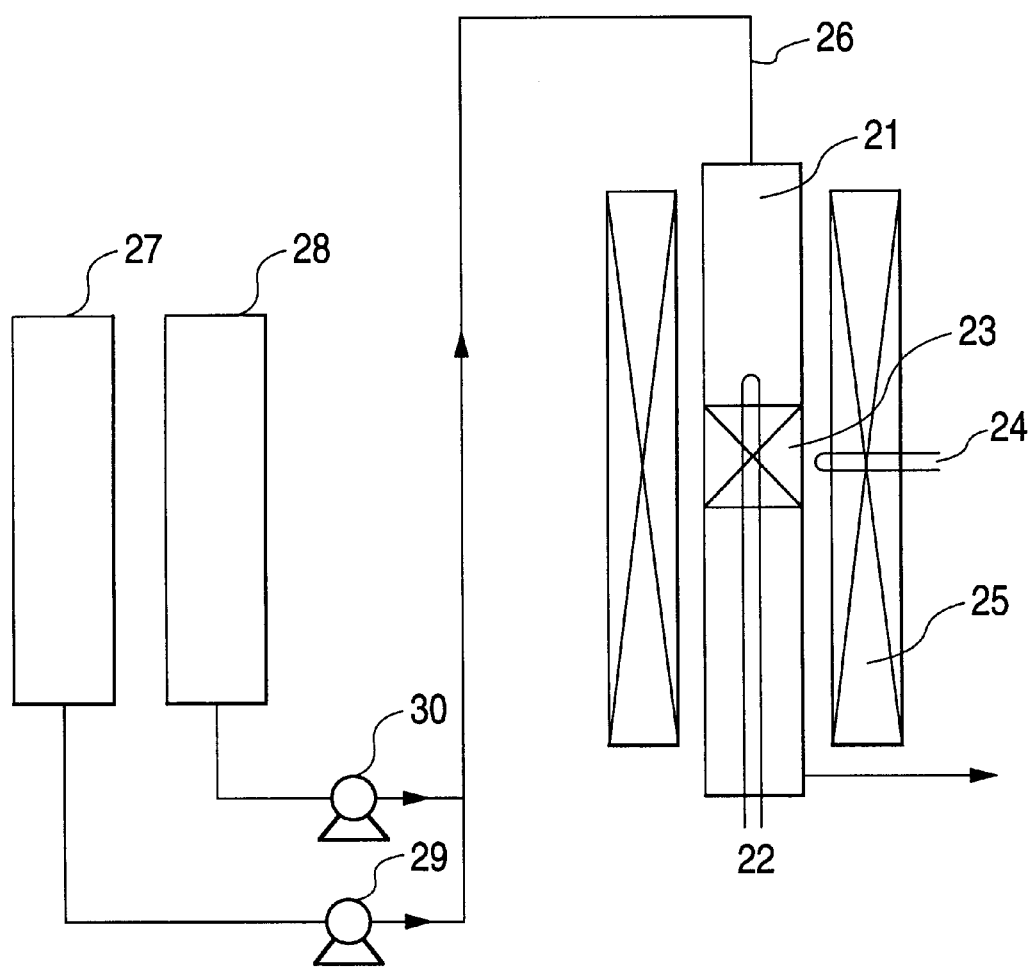
FIG. 4 is a schematic diagram of an isothermal type reaction apparatus for use in the process of the present invention.

In order to evaluate the coking resistance of the catalyst, the molded H-ZSM-5 zeolite catalyst which had not been subjected to steam treatment was allowed to undergo cyclization reaction test using the reaction apparatus shown in FIG. 4 in which $C_5$ distillate shown in Table 2 and $C_4$ distillate shown in Table 3 were supplied at a weight ratio of 4:6 (by weight). That is, 100 g of the molded catalyst was packed into a SUS reaction tube 21 having an inner diameter of 27.2 mm. The SUS reaction tube 21 was then heated by an electric furnace 25 the temperature of which can be controlled by a temperature adjusting thermocouple 24 in such a manner that the catalyst 23 was isothermally kept to 650° C. as determined by a thermometer 22. In this arrangement, water or steam was then supplied onto the substantially fresh catalyst through a feedstock inlet 26 at a pressure of 1 kg/cm².G and an $H_2O$ partial pressure of 0.8 atm for 6.2 hours so that the catalyst was subjected to treatment with steam. Thereafter, the average temperature of the catalyst 23 was isothermally adjusted to 520° C. using the temperature adjusting thermocouple 24. $C_5$ distillate having the composition shown in Table 2 in a feedstock tank 27 and $C_4$ distillate having the composition shown in Table 3 in a feedstock tank 28 were then supplied via pumps 29 and 30, respectively, onto the catalyst 23 in the SUS reaction tube 21 at a weight ratio of 4:6, a pressure of 5 kg/cm².G, a temperature of 520° C. and a WHSV (weight-hour spatial velocity) of 2.78 hr⁻¹. The yield of aromatic group was determined at the time each of after 5 hours and 40 hours from the beginning of the supply of these distillates. In addition, the amount of coke accumulated on the catalyst during the 48 hour reaction was also determined. The results are shown in Table 1.

EXAMPLE 2

To 6.75 kg of sodium silicate of special grade No. 3 ($SiO_2$: 25% by weight; $Na_2O$: 8% by weight, available from Fuji Chemical Co., Ltd.) were added 23.0 kg of $H_2O$, 0.186 kg of $Al_2(SO_4)_3 \cdot 16\ H_2O$ (available from Wako Pure Chemical Industries, Ltd.) and 0.198 kg of sulfuric acid (purity: 97%, available from Wako Pure Chemical Industries, Ltd.). To the mixture was then added 0.167 kg of a commercially available ZSM-5 having an already known $SiO_2/Al_2O_3$ molar ratio ($SiO_2/Al_2O_3$=50, available from NE-Kemcat Co., Ltd.) as a seed crystal to obtain a homogeneous gel. The gel thus obtained was charged into a 50-l autoclave where it was then stirred at a temperature of 150° C. and a rotary speed of 200 rpm for 25 hours to undergo crystallization.

Figure 5:
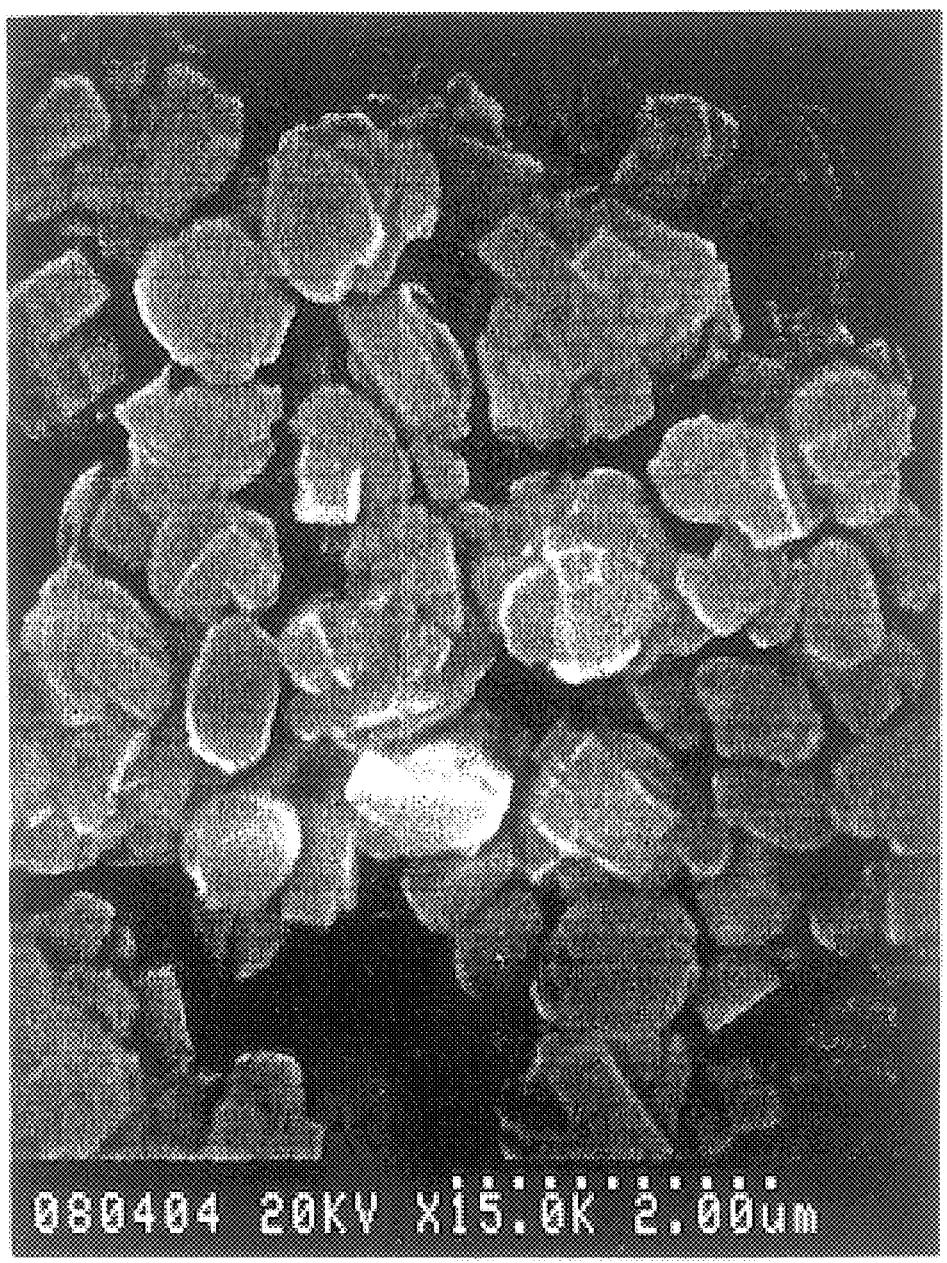
FIG. 5 is a scanning electron micrograph of the catalyst obtained in Example 2.

The slurry thus obtained was filtered, washed with a five-fold amount of water, and then dried at a temperature of 120° C. for 5 hours. A photograph of the dried matter taken by a scanning electron microscope is shown in FIG. 5. As can be seen in FIG. 5, ZSM-5 thus produced has a thickness of from 0.5 to 1 μm at the widest section and an average thickness of 0.7 μm.

Subsequently, the catalyst thus obtained was measured for $SiO_2/Al_2O_3$ molar ratio in the same manner as in Example 1.

A molded H-ZSM-5 zeolite catalyst having a zinc content of 10% by weight was then obtained in the same manner as in Example 1. The molded catalyst was measured for the amount of pyridine desorbed at a temperature of from 500° C. to 900° C. before and after treatment with steam at 650° C. for 5 hours and for the rate constant of first order reaction of n-hexane and the ratio of the number of surface acid sites to the total number of acid sites after treatment with steam at 650° C. for 11 hours in the same manner as in Example 1. The results are shown in Table 1.

The catalyst which had been subjected to treatment with steam at 650° C. for 11 hours was then evaluated for regeneration deterioration resistance and coking resistance in the same manner as in Example 1. The results are shown in Table 1.

EXAMPLE 3

To a solution obtained by adding 0.05 kg of NaOH and 4 kg of $H_2O$ to 8.0 kg of an aqueous solution of sodium silicate ($SiO_2$: 26% by weight; $Na_2O$: 7.0% by weight) was added a solution obtained by dissolving 0.61 kg of $Al_2(SO_4)_3 \cdot 16\ H_2O$ and 0.1 kg of 1,3-dimethylurea in 15 kg of $H_2O$ with stirring. To the mixture was then added 10 kg of a 5 wt % sulfuric acid to obtain a homogeneous gel. The gel thus obtained was then charged into a 50-l autoclave. The gel was then allowed to undergo synthesis reaction at a temperature of 160° C. with stirring at a power of from 0.5 to 1 kw/m² for 10 hours to obtain a seed slurry.

Subsequently, to 5.45 kg of sodium silicate of special grade No. 3 ($SiO_2$: 25% by weight; $Na_2O$: 8% by weight, available from Fuji Chemical Co., Ltd.) were added 11.0 kg of $H_2O$, 3.05 kg of $Al_2(SO_4)_3 \cdot 16\ H_2O$ (available from Wako Pure Chemical Industries, Ltd.) and 3.15 kg of sulfuric acid (purity: 97%, available from Wako Pure Chemical Industries, Ltd.). To the mixture was then added 11.67 kg of the above described slurry as a seed slurry to obtain a homogeneous gel. The gel thus obtained was charged into a 50-l autoclave where it was then stirred at a temperature of 150° C. and a rotary speed of 110 rpm for 39.5 hours to undergo crystallization.

The slurry thus obtained was filtered, washed with a five-fold amount of water, and then dried at a temperature of 120° C. for 5 hours. The zeolite thus obtained was then measured for particle diameter by a scanning electron microscope.

The catalyst thus obtained was then measured for $SiO_2/Al_2O_3$ molar ratio in the same manner as in Example 1.

Further, a molded H-ZSM-5 zeolite catalyst having a zinc content of 10% by weight was then obtained in the same manner as in Example 1. The molded catalyst was measured for the amount of pyridine desorbed at a temperature of from 500° C. to 900° C. before and after treatment with steam at 650° C. for 5 hours and for the rate constant of first order reaction of n-hexane and the ratio of the number of surface acid sites to the total number of acid sites after treatment with steam at 650° C. for 9.5 hours in the same manner as in Example 1. The results are shown in Table 1.

The catalyst which had been subjected to treatment with steam at 650° C. for 9.5 hours was then evaluated for regeneration deterioration resistance and coking resistance in the same manner as in Example 1. The results are shown in Table 1.

EXAMPLE 4

To 92 kg of sodium silicate of special grade No. 3 ($SiO_2$: 25% by weight; $Na_2O$: 8% by weight, available from Fuji Chemical Co., Ltd.) were added 95 kg of $H_2O$, 7.3 kg of $Al_2(SO_4)_3 \cdot 16\ H_2O$ (available from Wako Pure Chemical Industries, Ltd.), 3.8 kg of sulfuric acid (purity: 97%, available from Wako Pure Chemical Industries, Ltd.), and a solution of 1.15 kg of 1,3-dimethylurea in 150 kg of $H_2O$ with stirring to obtain a homogeneous gel. The gel thus obtained was charged into a 50-l autoclave where it was then allowed to undergo synthesis reaction at a temperature of 160° C. with stirring for 30 hours to obtain an Na type ZSM-5. The slurry thus synthesized was filtered, repeatedly washed with water until the pH value of the filtrate reached not more than 8, and then dried at a temperature of 120° C. for 20 hours. The slurry thus dried was then calcined at a temperature of 550° C. in the air for 3 hours to obtain 20 kg of an Na type ZSM-5 in the form of powder.

To 92 kg of sodium silicate of special grade No. 3 ($SiO_2$: 25% by weight; $Na_2O$: 8% by weight, available from Fuji Chemical Co., Ltd.) were added 245 kg of $H_2O$, 7.3 kg of $Al_2(SO_4)_3 \cdot 16\ H_2O$ (available from Wako Pure Chemical Industries, Ltd.), 3.8 kg of sulfuric acid (purity: 97%, available from Wako Pure Chemical Industries, Ltd.), and 3 kg of the above described Na type ZSM-5 powder to obtain a homogeneous gel. The gel thus obtained was charged into a 600-l autoclave where it was then allowed to undergo synthesis reaction at a temperature of 150° C. with stirring for 10 hours to obtain a seed slurry.

Subsequently, to 92 kg of sodium silicate of special grade No. 3 ($SiO_2$: 25% by weight; $Na_2O$: 8% by weight, available from Fuji Chemical Co., Ltd.) were added 245 kg of $H_2O$, 4.8 kg of $Al_2(SO_4)_3 \cdot 16\ H_2O$ (available from Wako Pure Chemical Industries, Ltd.) and 4.9 kg of sulfuric acid (purity: 97%, available from Wako Pure Chemical Industries, Ltd.). To the mixture was then added 167 kg of the above described slurry as a seed slurry to obtain a homogeneous gel. The gel thus obtained was charged into a 600-l autoclave where it was then stirred at a temperature of 160° C. and a rotary speed of 130 rpm for 45 hours to undergo crystallization.

Figure 6:
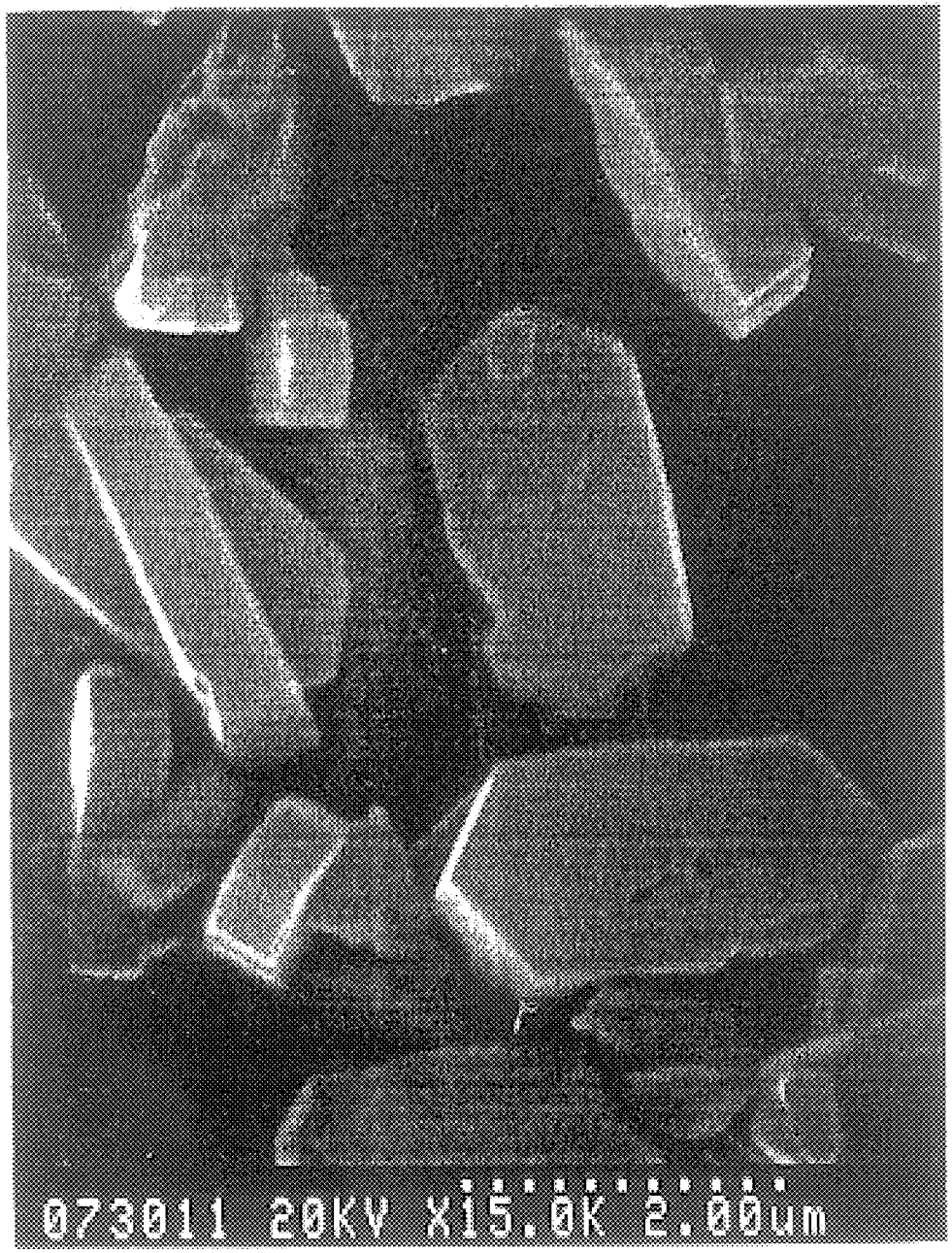
FIG. 6 is a scanning electron micrograph of the catalyst obtained in Example 4.

The slurry thus obtained was washed with water with centrifugal filtration until the pH value thereof reached not more than 9, and then dried at a temperature of 120° C. for 5 hours. A photograph of the dried material taken by a scanning electron microscope is shown in FIG. 6. As can be seen in FIG. 6, Na type ZSM-5 thus produced has a thickness of from 2 to 3 μm at the widest section and an average thickness of 2.5 μm.

Subsequently, the dried matter thus obtained was then measured for $SiO_2/Al_2O_3$ molar ratio by means of a fluorescent X-ray analyzer. The results were 39.

Further, the dried mater was subjected to ion exchange in a 10 wt% slurry in a 1-N sulfuric acid at room temperature for 3 hours, washed with water with centrifugal filtration until the pH value thereof reached not less than 4.5, and then dried at a temperature of 120° C. for 10 hours to obtain H-ZSM-5. To a solution of 144 g of zinc nitrate hexahydrate in 200 g of water was added 5 g of acetic acid. To the mixture were then added 200 g of alumina sol (Alumina Sol 520, available from Nissan Chemical Industries, Ltd.), 20 g of boehmite and 200 g of the above described H-ZSM-5. The mixture was then stirred for 2 hours. The mixture which had lost water content and become clay-like was molded into a cylinder shape having a diameter of 1.6 mm and a length of 4 to 6 mm, dried at a temperature of 120° C. for 2 hours, and then calcined at a temperature of 500° C. in an air atmosphere in an electric furnace for 3 hours to form an H-ZSM-5 zeolite catalyst having a zinc content of 10% by weight.

Further, the molded catalyst which had been converted into H type without or after being subjected to steam treatment at 650° C. and an $H_2O$ partial pressure of 0.8 atm for 5 hours was measured for the amount of pyridine desorbed at 500° C. to 900° C. by hot desorption method in the same manner as in Example 1.

Subsequently, the catalyst which had been subjected to treatment with steam at 650° C. and an $H_2O$ partial pressure of 0.8 atm for 8 hours was measured for the rate constant of first order reaction of n-hexane and the ratio of the number of surface acid sites to the total number of acid sites in accordance with the above described method. The catalyst was also examined for regeneration deterioration resistance and coking resistance in the same manner as in Example 1. The results are shown in Table 1.

EXAMPLE 5

To 2,300 kg of sodium silicate of special grade No. 3 ($SiO_2$: 25% by weight; $Na_2O$: 8% by weight, available from Fuji Chemical Co., Ltd.) were added 2,375 kg of $H_2O$, 183 kg of $Al_2(SO_4)_3 \cdot 16\ H_2O$ (available from Wako Pure Chemical Industries, Ltd.), 95 kg of sulfuric acid (purity: 97%, available from Wako Pure Chemical Industries, Ltd.), and a solution of 30 kg of 1,3-dimethylurea in 3,750 kg of $H_2O$ with stirring to obtain a homogeneous gel. The gel thus obtained was charged into a 18 $m^3$ autoclave where it was then allowed to undergo synthesis reaction at a temperature of 160° C. with stirring for 30 hours to obtain an Na type ZSM-5. The slurry thus synthesized was filtered, repeatedly washed with water until the pH value of the filtrate reached not more than 8, and then dried at a temperature of 120° C. for 30 hours. The slurry thus dried was then calcined at a temperature of 550° C. in the air for 3 hours to obtain 520 kg of an Na type ZSM-5 in the form of powder.

To 1,930 kg of sodium silicate of special grade No. 3 ($SiO_2$: 25% by weight; $Na_2O$: 8% by weight, available from Fuji Chemical Co., Ltd.) were added 5,780 kg of $H_2O$, a 137 kg/650 kg mixture of sulfuric acid band (aluminum oxide content: 8.1% by weight; pH: 3.7, available from Sumitomo Chemical Co., Ltd.)/water, a 81 kg/800 kg mixture of sulfuric acid (purity: 97%, available from Wako Pure Chemical Industries, Ltd.)/water, and 75 kg of the above described Na type ZSM-5 powder to obtain a homogeneous gel. The gel thus obtained was charged into a 18 $m^3$ autoclave where it was then allowed to undergo synthesis reaction at a temperature of 150° C. with stirring for 10 hours to obtain a seed slurry.

Figure 7:
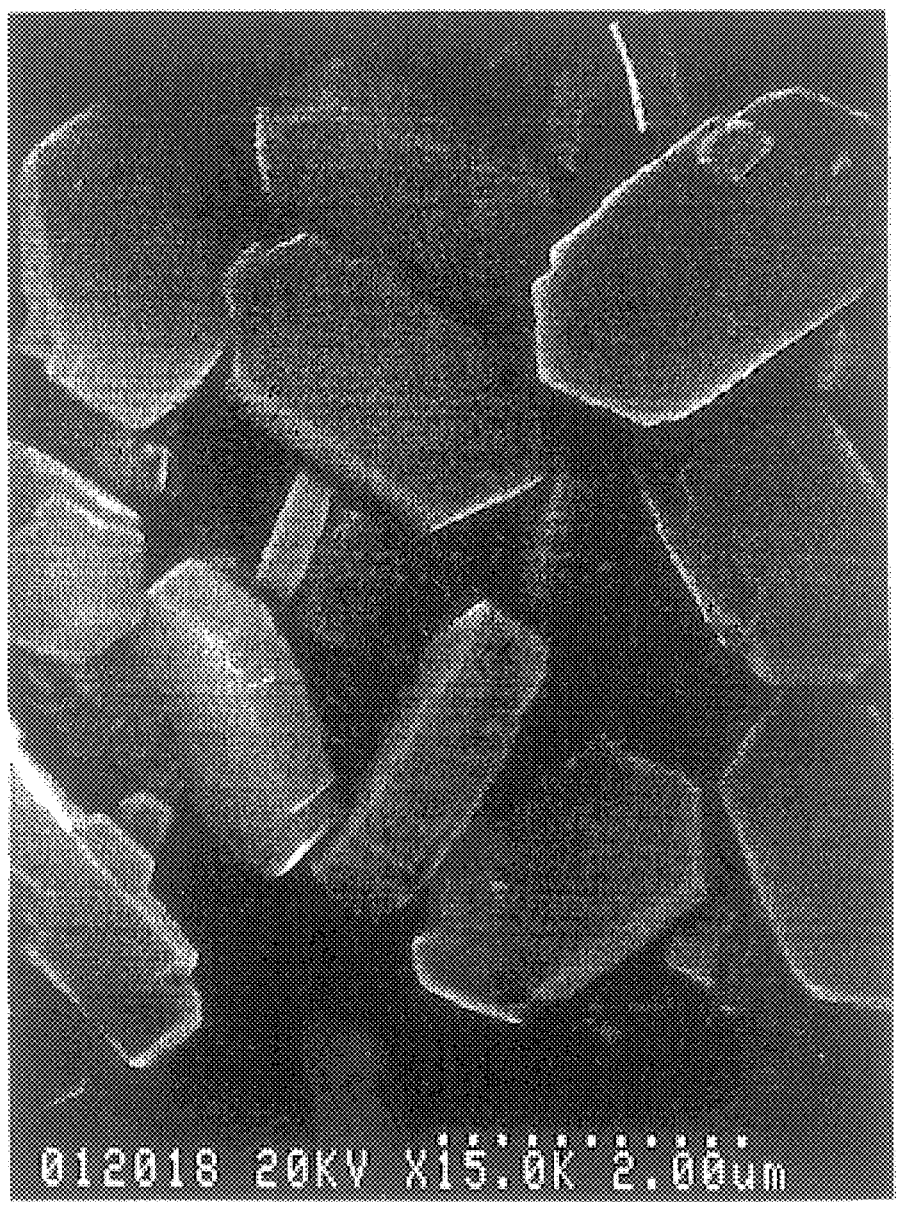
FIG. 7 is a scanning electron micrograph of the catalyst obtained in Example 5.

Subsequently, to 1,910 kg of sodium silicate of special grade No. 3 ($SiO_2$: 25% by weight; $Na_2O$: 8% by weight, available from Fuji Chemical Co., Ltd.) were added 5,050 kg of $H_2O$, a 196 kg/930 kg mixture of sulfuric acid band (aluminum oxide content: 8.1% by weight; pH: 3.7, available from Sumitomo Chemical Co., Ltd.)/water, a 70 kg/800 kg mixture of sulfuric acid (purity: 97%, available from Wako Pure Chemical Industries, Ltd.)/water, and 4,480 kg of the above described slurry as a seed slurry to obtain a homogeneous gel. The gel thus obtained was charged into a 18 $m^3$ autoclave where it was then stirred at a temperature of 160° C. and a rotary speed of 40 rpm for 20 hours to undergo crystallization. The slurry thus obtained was washed with water with centrifugal filtration until the pH value thereof reached not more than 9, subjected to ion exchange in a 10 wt % slurry in a 1-N sulfuric acid at 70° C. for 5 hours, washed with water with centrifugal filtration until the pH value thereof reached not less than 4.5, and then dried at a temperature of 120° C. for 30 hours. A photograph of the dried material taken by a scanning electron microscope is shown in FIG. 7. As can be seen in FIG. 7, H-ZSM-5 thus produced has a thickness of from 2 to 3 μm at the widest section and an average thickness of 2.5 μm.

Subsequently, the dried matter thus obtained was then measured for $SiO_2/Al_2O_3$ molar ratio by means of a fluorescent X-ray analyzer. The results were 41.

To a solution of 144 g of zinc nitrate hexahydrate in 200 g of water was added 5 g of acetic acid. To the mixture were then added 200 g of alumina sol (Alumina Sol 520, available from Nissan Chemical Industries, Ltd.), 20 g of boehmite and 200 g of the above described H-ZSM-5. The mixture was then stirred for 2 hours. The mixture which had become clay-like was molded into a cylinder shape having a diameter of 1.6 mm and a length of 4 to 6 mm, dried at a temperature of 120° C. for 2 hours, and then calcined at a temperature of 500° C. in an air atmosphere in an electric furnace for 3 hours to form an H-ZSM-5 zeolite catalyst having a zinc content of 10% by weight.

Further, the molded catalyst which had been made of H type was measured for the amount of pyridine desorbed at 500° C. to 900° C. by hot desorption method before and after treatment with steam at 650° C. and an $H_2O$ partial pressure of 0.8 atm for 5 hours in the same manner as in Example 1.

Subsequently, the catalyst which had been subjected to treatment with steam at 650° C. and an $H_2O$ partial pressure of 0.8 atm for 8.5 hours was measured for the rate constant of first order reaction of n-hexane and the ratio of the number of surface acid sites to the total number of acid sites in accordance with the above described method. The catalyst was also examined for regeneration deterioration resistance and coking resistance in the same manner as in Example 1. The results are shown in Table 1.

COMPARATIVE EXAMPLE 1

(1) Synthesis of seed slurry

To a solution obtained by adding 0.64 g of NaOH and 133 g of $H_2O$ to 129 g of an aqueous solution of sodium silicate ($SiO_2$: 25.2% by weight; $Na_2O$: 7.35% by weight) was added a solution of 0.97 g of $Al_2(SO_4)_3 \cdot 16\ H_2O$ and 0.2 g of 1,3-dimethylurea in 230 g of $H_2O$ with stirring. To the mixture was then added 140 g of a 4.6 wt % sulfuric acid to obtain a homogeneous gel. The gel thus obtained exhibited a pH value of 10.8. The gel was charged into a 1-l autoclave where it was then allowed to undergo synthesis reaction at a temperature of 180° C. for 40 hours.

The resulting slurry was then cooled to a temperature of 30° C. A part of the slurry was filtered, and then dried at a temperature of 120° C. for 8 hours. The material thus dried exhibited an X-ray diffraction pattern coinciding with that of ZSM-5.

(2) Synthesis of zeolite

To 400 g of a gel having the same composition as prepared above in the process (1) was added 250 g of the seed slurry obtained in the process (1). The mixture was then thoroughly stirred. The mixture was charged into a 1-l autoclave where it was then allowed to undergo crystallization at a temperature of 160° C. for 15 hours.

The resulting slurry was filtered, washed with a five-fold amount of water, and then dried at a temperature of 120° C. for 8 hours to obtain zeolite the X-ray diffraction pattern of which coincides with that of ZSM-5.

Figure 8:
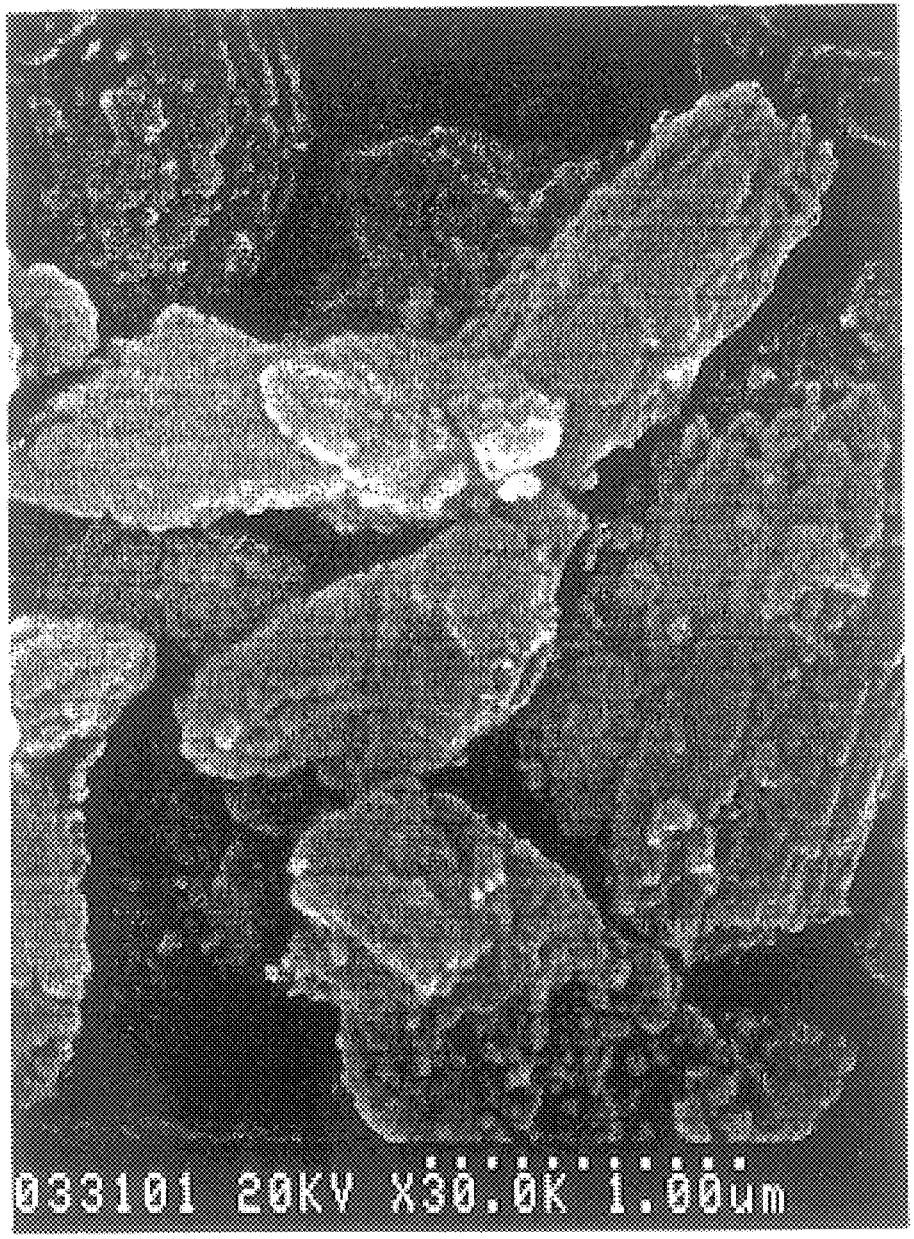
FIG. 8 is a scanning electron micrograph of the catalyst obtained in Comparative Example 1.

A photograph of the zeolite taken by a scanning electron microscope is shown in FIG. 8. As can be seen in FIG. 8, ZSM-5 thus produced was an aggregate of finely divided particles. The aggregate was a roughened particle having a thickness of about 0.2 μm at the widest section thereof.

The catalyst thus obtained was then measured for $SiO_2/Al_2O_3$ molar ratio in the same manner as in Example 1.

A molded H-ZSM-5 zeolite catalyst having a zinc content of 10% by weight was then obtained in the same manner as in Example 1. The molded catalyst was measured for the amount of pyridine desorbed at a temperature of from 500° C. to 900° C. before and after treatment with steam at 650° C. for 5 hours and for the rate constant of first order reaction of n-hexane and the ratio of the number of surface acid sites to the total number of acid sites after treatment with steam at 650° C. for 3.8 hours in the same manner as in Example 1. The results are shown in Table 1.

The catalyst which had been subjected to treatment with steam at 650° C. for 3.8 hours was then evaluated for regeneration deterioration resistance and coking resistance in the same manner as in Example 1. The results are shown in Table 1.

As can be seen in Table 1, the zeolite-based catalyst of this comparative example exhibited a poor regeneration deterioration resistance and a great accumulation of coke during coking resistance test because of its small particle diameter, large ratio of the number of surface acid sites to the total number of acid sites and large parameter α in desorbed amount of pyridine.

COMPARATIVE EXAMPLE 2

100 g of 1,8-diamino-4-aminomethyloctane, 4 g of aluminum sulfate and 5 g of sodium hydroxide were dissolved in 200 g of water. To the solution thus obtained was then added 250 g of silica sol (30% $SiO_2$) to obtain a homogeneous solution. To the solution was then added dropwise a 20% sulfuric acid with stirring to adjust the pH value of the solution to 12.5. Thus, a homogeneous gel was obtained. The gel thus obtained was then stirred at a speed as high as 2,000 rpm in a mixer for 20 minutes. The gel was charged into an autoclave where it was then allowed to undergo crystallization with stirring at 50 rpm at a temperature of 150° C. for 24 hours. The resulting slurry was filtered, washed with a five-fold amount of water, and then dried at a temperature of 120° C. for 8 hours to obtain a catalyst the particle diameter of which was not less than 5 μm as measured by a scanning electron microscope.

A molded H-ZSM-5 zeolite catalyst having a zinc content of 10% by weight was then obtained in the same manner as in Example 1. The molded catalyst was measured for the amount of pyridine desorbed at a temperature of from 500° C. to 900° C. before and after treatment with steam at 650° C. for 5 hours and for the rate constant of first order reaction of n-hexane and the ratio of the number of surface acid sites to the total number of acid sites after treatment with steam at 650° C. for 16 hours in the same manner as in Example 1. The results are shown in Table 1.

The catalyst which had been subjected to treatment with steam at 650° C. for 16 hours was then evaluated for regeneration deterioration resistance and coking resistance in the same manner as in Example 1. The results are shown in Table 1.

As can be seen in Table 1, the zeolite-based catalyst of this comparative example exhibited a good regeneration deterioration resistance because of its large particle diameter and small ratio of the number of surface acid sites to the total number of acid sites but rapidly deteriorates due to coking.

COMPARATIVE EXAMPLE 3

To 6.75 kg of sodium silicate of special grade No. 3 ($SiO_2$: 25% by weight; $Na_2O$: 8% by weight, available from Fuji Chemical Co., Ltd.) were added 23.0 kg of $H_2O$, 0.41 kg of $Al_2(SO_4)_3.16 H_2O$ (available from Wako Pure Chemical Industries, Ltd.) and 0.198 kg of sulfuric acid (purity: 97%, available from Wako Pure Chemical Industries, Ltd.). To the mixture was then added 0.167 kg of a commercially available ZSM-5 having an already known $SiO_2/Al_2O_3$ molar ratio ($SiO_2/Al_2O_3=25$, available from NE-Kemcat Co., Ltd.) as a seed crystal to obtain a homogeneous gel. The gel thus obtained was charged into a 50-l autoclave where it was then stirred at a temperature of 150° C. and a rotary speed of 200 rpm for 25 hours to undergo crystallization.

The slurry thus obtained was filtered, washed with a five-fold amount of water, and then dried at a temperature of 120° C. for 5 hours. The zeolite thus obtained was measured for $SiO_2/Al_2O_3$ molar ratio in the same manner as in Example 1. The results were 18.

A molded H-ZSM-5 zeolite catalyst having a zinc content of 10% by weight was then obtained in the same manner as in Example 1. The molded catalyst was measured for the amount of pyridine desorbed at a temperature of from 500° C. to 900° C. before and after treatment with steam at 650° C. for 5 hours and for the rate constant of first order reaction of n-hexane and the ratio of the number of surface acid sites to the total number of acid sites after treatment with steam at 650° C. for 3 hours in the same manner as in Example 1. The results are shown in Table 1.

The catalyst which had been subjected to treatment with steam at 650° C. for 3 hours was then evaluated for regeneration deterioration resistance and coking resistance in the same manner as in Example 1. The results are shown in Table 1.

As can be seen in Table 1, the zeolite-based catalyst of this comparative example exhibits a poor regeneration deterioration resistance because of its small $SiO_2/Al_2O_3$ molar ratio.

COMPARATIVE EXAMPLE 4

A commercially available H-ZSM-5 zeolite ($SiO_2/Al_2O_3=250$, available from NE-Kemcat Co., Ltd.) was measured for primary particle diameter. The zeolite was then processed in the same manner as in Example 1 to obtain a molded H-ZSM-5 zeolite-based catalyst having a zinc content of 10% by weight. The molded catalyst was measured for the amount of pyridine desorbed at a temperature of from 500° C. to 900° C. before and after treatment with steam at 650° C. for 5 hours and for the rate constant of first order reaction of n-hexane and the ratio of the number of surface acid sites to the total number of acid sites after treatment with steam at 650° C. for 1 hour in the same manner as in Example 1. The results are shown in Table 1.

The catalyst which had been subjected to treatment with steam at 650° C. for 1 hour was then evaluated for regeneration deterioration resistance and coking resistance in the same manner as in Example 1. The results are shown in Table 1.

As can be seen in Table 1, the zeolite-based catalyst of this comparative example exhibits a poor regeneration deterioration resistance because of its too large an $SiO_2/Al_2O_3$ molar ratio that gives a low crystallinity resulting in a large parameter α in desorbed amount of pyridine before and after treatment with steam.

COMPARATIVE EXAMPLE 5

290 g of sodium silicate (water-glass No. 3) was dissolved in 230 g of distilled water to give Solution A. Separately, 11.4 g of aluminum sulfate, 23.4 g of 1,3-dimethylurea and 13 g of sulfuric acid were dissolved in 300 g of distilled water to give Solution B. Using a homogenizer, Solution B was added to Solution A with vigorous stirring. The mixture was stirred for about 3 hours until the gel composition became homogeneous. The gel composition was charged into a 1-l autoclave where it was then allowed to undergo reaction at a temperature of 150° C. with stirring at 1,000 rpm for 35 hours for crystallization. After the termination of the reaction, the resulting solid matter was filtered, washed with water, dehydrated, dried, and then calcined at a temperature of 550° C. in the air for 3 hours. The H-ZSM-5 type zeolite thus obtained was then measured for $SiO_2/Al_2O_3$ molar ratio in the same manner as in Example 1. The results were 46. The zeolite thus obtained was also measured for particle diameter under a scanning electron microscope.

The zeolite was then processed in the same manner as in Example 1 to obtain a molded ZSM-5 zeolite-based catalyst having a zinc content of 10% by weight. The molded catalyst was measured for the amount of pyridine desorbed at a temperature of from 500° C. to 900° C. before and after treatment with steam at 650° C. for 5 hours and for the rate constant of first order reaction of n-hexane and the ratio of the number of surface acid sites to the total number of acid sites after treatment with steam at 650° C. for 3 hours in the same manner as in Example 1. The results are shown in Table 1.

The catalyst which had been subjected to treatment with steam at 650° C. for 3 hours was then evaluated for regeneration deterioration resistance and coking resistance in the same manner as in Example 1. The results are shown in Table 1.

As can be seen in Table 1, the zeolite-based catalyst of this comparative example exhibits a poor regeneration deterioration resistance because the parameter α in desorbed amount of pyridine before and after treatment with steam is as large as 1.8.

COMPARATIVE EXAMPLE 6

A commercially available H-ZSM-5 zeolite ($SiO_2/Al_2O_3=400$) was measured for primary particle diameter. The zeolite was then processed in the same manner as in Example 1 to obtain a molded H-ZSM-5 zeolite-based catalyst having a zinc content of 10% by weight. The molded catalyst was measured for the amount of pyridine desorbed at a temperature of from 500° C. to 900° C. before and after treatment with steam at 650° C. for 5 hours and for the rate constant of first order reaction of n-hexane and the ratio of the number of surface acid sites to the total number of acid sites before the treatment with steam in the same manner as in Example 1. The results are shown in Table 1.

The catalyst which had not been subjected to treatment with water was then evaluated for regeneration deterioration resistance and coking resistance in the same manner as in Example 1. The results are shown in Table 1.

As can be seen in Table 1, the zeolite-based catalyst of this comparative example exhibits a low activity and produces an aromatic group in a low yield because of its too large an $SiO_2/Al_2O_3$ molar ratio.

EXAMPLE 6

A zeolite catalyst synthesized and molded in the same manner as in Example 4 was packed into a single-stage insulation type reactor where it was then subjected to treatment with steam at a temperature of 650° C. and a pressure of 5 kg/cm².G for 8 hours. The zeolite catalyst was further allowed to undergo cyclization reaction test in which $C_5$ distillate shown in Table 2 and $C_4$ distillate shown in Table 3 were supplied at a weight ratio of 4:6 (by weight), a pressure of 5 kg/cm².G, an inlet temperature of 530° C. and a WHSV (weight-hour spatial velocity) of 2.8 hr$^{-1}$ for 48 hours. The carbon materials which had been accumulated during 48 hours of the cyclization reaction were burnt away (regeneration) while a nitrogen gas having an oxygen concentration of from 1 to 1.5 vol % was cycled at a flow rate of 5,000 Nm³/hr at a temperature of from 480° C. to 530° C. and a pressure of 5 kg/cm².G for 40 to 43 hours. The above described cyclization reaction and regeneration were repeated 75 times (300 days). The results of 1st and 75th cyclization reactions are shown in Table 4.

COMPARATIVE EXAMPLE 7

A zeolite catalyst synthesized and molded in the same manner as in Comparative Example 1 was packed into a single-stage insulation type reactor where it was then subjected to treatment with steam at a temperature of 650° C. and a pressure of 5 kg/cm².G for 8 hours. The zeolite catalyst was further allowed to undergo cyclization reaction test in which $C_5$ distillate shown in Table 2 and $C_4$ distillate shown in Table 3 were supplied at a weight ratio of 4:6 (by weight), a pressure of 5 kg/cm².G, an inlet temperature of 530° C. and a WHSV (weight-hour spatial velocity) of 2.8 hr$^{-1}$ for 48 hours. The carbon materials which had been accumulated during 48 hours of the cyclization reaction were burnt away (regeneration) while a nitrogen gas having an oxygen concentration of from 1 to 1.5 vol % was cycled at a flow rate of 5,000 Nm³/hr at a temperature of from 480° C. to 530° C. and a pressure of 5 kg/cm².G for 40 to 43 hours. The above described cyclization reaction and regeneration were repeated 75 times (300 days). The results of 1st and 75th cyclization reactions are shown in Table 4. As can be seen in Table 4, the zeolite-based catalyst of this comparative example exhibits a poor regeneration deterioration resistance and a rapid permanent activity deterioration because of its large ratio of the number of surface acid sites to the total number of acid sites.

EXAMPLE 7

The catalyst of Example 4 which had been subjected to treatment with steam at 650° C. for 8 hours was measured for total zinc content by fluorescent X-ray spectroscopy, treated with hydrochloric acid, and then measured for zinc oxide content by atomic-absorption spectroscopy. As a result, the catalyst was found to have a zinc oxide content of 2.9% by weight and a zinc aluminate content of 22.4% by weight based on the weight of the catalyst. 10 g of the catalyst was then packed into a reaction tube where it was then subjected to reduction at a temperature of 500° C. while hydrogen was being allowed to flow at a rate of 20 l/hr for 20 hours. The results of the measurement of zinc oxide content and zinc aluminate content before and after the reduction with hydrogen are shown in Table 5. Further, the catalyst which had not been subjected to reduction with hydrogen and the catalyst which had been subjected to reduction with hydrogen were examined for coking resistance with $C_4$ distillate and $C_5$ distillate in accordance with the above described method. The results are shown in Table 5.

COMPARATIVE EXAMPLE 8

100 g of H-ZSM-5 free of zinc obtained in Example 4 was dipped in a 7 wt % aqueous solution of zinc nitrate, subjected to evaporation to dryness, dried at a temperature of 120° C. for 4 hours, and then calcined at a temperature of 500° C. for 3 hours to prepare a catalyst having a zinc content of 2.0% by weight. Subsequently, the catalyst thus prepared was compression-molded, and then ground down to 9 to 20 meshes. 20 g of the catalyst thus obtained was packed into a quartz glass reactor having an inner diameter of 12 mm where it was then subjected to heat treatment at 650° C. and atmospheric pressure in a mixture of steam and nitrogen having a steam content of 80% by weight for 1 hour. The catalyst was then measured for zinc oxide content and zinc aluminate content by fluorescent X-ray spectroscopy and atomic-absorption spectroscopy. The catalyst was then subjected to reduction with hydrogen in the same manner as in Example 8. Further, the catalyst which had not been subjected to reduction with hydrogen and the catalyst which had been subjected to reduction with hydrogen were examined for coking resistance with $C_4$ distillate and $C_5$ distillate in accordance with the above described method. The results are shown in Table 5.

COMPARATIVE EXAMPLE 9

H-ZSM-5 free of zinc obtained in Example 1 was subjected to treatment with steam at 650° C., and then mixed with zinc aluminate available from Kojundo Kagaku Kenkyujo in an amount of 10% by weight based on the total weight of the catalyst as calculated in terms of zinc. The catalyst thus obtained was then examined for coking resistance with $C_4$ distillate and $C_5$ distillate. The results are shown in Table 5.

TABLE 1

| | Example Nos. | | | | | Comparative Example Nos. | | | | | |
|---|---|---|---|---|---|---|---|---|---|---|---|
| | 1 | 2 | 3 | 4 | 5 | 1 | 2 | 3 | 4 | 5 | 6 |
| $SiO_2/Al_2O_3$ molar ratio | 36 | 40 | 31 | 39 | 41 | 28 | 70 | 18 | 250 | 46 | 400 |
| Primary particle diameter (μm) | 1.7 | 0.7 | 2 | 2.5 | 2.5 | 0.2 | ≧5 | 0.8 | 1.3 | 1 | 3.2 |
| Crystallinity[1] | 136 | 141 | 123 | 153 | 146 | 100 | 140 | 87 | 75 | 100 | 65 |
| Desorption of pyridine at 500–900° C. before 650° C. × 5 hr steaming (μmol/g-cat) | 166 | 211 | 222 | 175 | 183 | 141 | 220 | 305 | 102 | 310 | 83 |
| Desorption of pyridine at 500–900° C. after 650° C. × 5 hr steaming (μmol/g-cat) | 99 | 107 | 114 | 105 | 107 | 75 | 110 | 89 | 44 | 100 | 40 |
| Parameter[3] in desorption of pyridine | 1.3 | 1.3 | 1.1 | 1.2 | 1.1 | 2.6 | 1.2 | 2.3 | 8.4 | 1.8 | 9.6 |
| Steaming time before regeneration deterioration test and coking deterioration test (hr) | 6.2 | 11 | 9.5 | 8 | 8.5 | 3.8 | 16 | 3 | 1 | 3 | 0 |
| Surface acid site/total acid site × 100 (%) | 8.6 | 7.9 | 7.3 | 5.7 | 5.0 | 19.9 | 2.2 | 15.3 | 1.2 | 7.5 | 2.3 |
| Regeneration deterioration resistance test | | | | | | | | | | | |
| Rate constant of first order reaction of decomposition of n-hexane before regeneration deterioration test (sec$^{-1}$) | 0.26 | 0.25 | 0.26 | 0.26 | 0.26 | 0.23 | 0.26 | 0.26 | 0.28 | 0.26 | 0.12 |
| Rate constant of first order reaction of decomposition of n-hexane after | 0.26 | 0.25 | 0.26 | 0.26 | 0.26 | 0.19 | 0.26 | 0.11 | 0.12 | 0.13 | 0.09 |

TABLE 1-continued

|  | Example Nos. | | | | | Comparative Example Nos. | | | | | |
| --- | --- | --- | --- | --- | --- | --- | --- | --- | --- | --- | --- |
|  | 1 | 2 | 3 | 4 | 5 | 1 | 2 | 3 | 4 | 5 | 6 |
| regeneration deterioration test (sec$^{-1}$) |  |  |  |  |  |  |  |  |  |  |  |
| Coking resistance test |  |  |  |  |  |  |  |  |  |  |  |
| Yield of aromatic group after 5 hours (wt %) | 44.0 | 43.4 | 42.6 | 43.4 | 43.7 | 39.7 | 43.2 | 43.3 | 43.2 | 43.5 | 31.2 |
| Yield of aromatic group after 40 hours (wt %) | 41.8 | 40.2 | 40.2 | 41.6 | 41.5 | 39.0 | 31.5 | 41.8 | 40.8 | 40.8 | 30.3 |
| Yield of coke (wt-ppm/feed) | 290 | 320 | 520 | 330 | 360 | 1530 | 430 | 1620 | 460 | 430 | 328 |

[1] Determined from the sum of peak height at 2θ = 23.1°, 24.0°, 24.4° in x-ray diffraction pattern of zeolite relative to that of Comparative Example 1 as 100
[2] Measured before regeneration deterioration test and coking deterioration test
[3] Parameter represented by Equation 1

TABLE 2

| Component | % Composition (by weight) |
| --- | --- |
| $C_3H_8$ | 0.0 |
| $C_3H_6$ | 0.0 |
| $C_4H_{10}$ | 0.9 |
| $C_4H_8$ | 0.0 |
| $C_5H_{12}$ | 72.0 |
| $C_5H_{10}$ | 27.1 |

TABLE 3

| Component | % Composition (by weight) |
| --- | --- |
| $C_3H_8$ | 0.1 |
| $C_3H_6$ | 0.6 |
| $C_4H_{10}$ | 24.5 |
| $C_4H_8$ | 74.2 |
| $C_5H_{12}$ | 0.4 |
| $C_5H_{10}$ | 0.2 |

TABLE 4

|  | Example 6 | Comparative Example 7 |
| --- | --- | --- |
| Unregenerated |  |  |
| Yield of aromatic group (wt %) | 42.3 | 42.3 |
| Specific activity[1] | 1 | 1 |
| 75th regeneration |  |  |
| Yield of aromatic group (wt %) | 40.0 | 37.0 |
| Specific activity | 0.8 | 0.5 |

[1] Represented by rate constant of first order reaction of decomposition of $C_5$ paraffin calculated from the following equation relative to that determined before 1st time regeneration as 1:

$$\text{First order reaction rate constant of } C_5 \text{ paraffin decomposition (sec}^{-1}\text{)} = \frac{1}{\theta} \times \ln \frac{100}{100 - (\% \text{ conversion of } C_5 \text{ paraffin})}$$

where θ (sec) = volume of catalyst bed (m³)/flow rate of fluid feedstock (m³/sec)
conversion of $C_5$ paraffin (%) = {(concentration of $C_5$ paraffin in feedstock (wt %) − concentration of $C_5$ paraffin in reaction product (wt %))/concentration of $C_5$ paraffin in feedstock (wt %)} × 100

TABLE 5

|  | Example 7 | Comparative Example 8 | Comparative Example 9 |
| --- | --- | --- | --- |
| Before reduction with $H_2$ |  |  |  |
| Zinc oxide content (wt %) | 2.9 | 2.5 | 0.0 |
| Zinc aluminate content (wt %) | 22.4 | 0.0 | 28.0 |
| After reduction with $H_2$ |  |  |  |
| Zinc oxide content (wt %) | 2.9 | 1.0 | — |
| Zinc aluminate content (wt %) | 22.4 | 0.0 | — |
| Coking resistance test |  |  |  |
| Before reduction with $H_2$ |  |  |  |
| Yield of aromatic group after 5 hr (wt %) | 44.0 | 44.2 | 28.0 |
| Yield of aromatic group after 40 hr (wt %) | 41.8 | 42.0 | 27.3 |
| After reduction with $H_2$ |  |  |  |
| Yield of aromatic group after 5 hr (wt %) | 43.8 | 35.4 | — |
| Yield of aromatic group after 40 hr (wt %) | 41.9 | 33.4 | — |

As demonstrated above, the present invention provides a catalyst having excellent regeneration deterioration resistance and coking resistance. That is, the amount of carbon materials accumulated on the catalyst during a reaction which uses a feedstock containing an aromatic hydrocarbon or which provides a product containing an aromatic hydrocarbon is reduced. In addition, temporary activity drop due to carbon materials is inhibited. Furthermore, permanent activity deterioration of the catalyst due to dealumination in a high temperature atmosphere having water content, as that occurred in the combustion and elimination, with an oxygen-containing inert gas, of the carbon materials is inhibited. Accordingly, the catalyst and the method of the present invention can be widely used in petrochemical industry and petroleum refining industry. In particular, the method of the present invention can be effectively used in the production of aromatic compounds and high-octane gasoline.

While the invention has been described in detail and with reference to specific embodiments thereof, it will be apparent to one skilled in the art that various changes and modifications can be made therein without departing from the spirit and scope thereof.

What is claimed is:

1. A high silica content zeolite-based catalyst for use in a reaction which uses a feedstock containing an aromatic hydrocarbon or which gives a product containing an aromatic hydrocarbon, which catalyst satisfies the following requirements (1), (2), (3) and (4):

(1) the zeolite constituting said zeolite-based catalyst has an $SiO_2/Al_2O_3$ molar ratio of from 20 to 200;

(2) the zeolite constituting said zeolite-based catalyst has a primary particle diameter of from 0.3 to 3 $\mu$m;

(3) when said zeolite-based catalyst is converted into H type, the H type zeolite-based catalyst has a ratio of the number of surface acid sites to the total number of acid sites is from 0.03 to 0.15; and (4) said zeolite-based catalyst exhibits a pyridine-desorbed amount (B) as measured at a temperature of from 500° C. to 900° C. by a hot desorption method when converted into H type after being subjected to a steam treatment at an $H_2O$ partial pressure of 0.8 atm and a temperature of 650° C. for 5 hours, and a pyridine-desorbed amount (A) as measured at a temperature of from 500° C. to 900° C. by a hot desorption method when converted into H type without said steam treatment, which amounts satisfy the following requirements:

$$\alpha \leq 1.6$$

$$\alpha = \left(\frac{1}{B^2} - \frac{1}{A^2}\right) \div 5 \times 10^5.$$

2. The catalyst according to claim 1, which provides a first order reaction rate constant of n-hexane of not less than 0.2 as determined at 500° C. and atmospheric pressure.

3. The catalyst according to claim 1, which comprises a mixture of zeolite and at least one member selected from the group consisting of the group VIII, Ib, IIb and IIIb metals and compounds thereof.

4. The catalyst according to claim 3, which has a pore volume of not less than 0.2 cc per g of the catalyst.

5. The catalyst according to claim 3, which comprises a mixture of zeolite, a zinc component and alumina.

6. The catalyst according to claim 3, which comprises a mixture of zeolite, a zinc component and alumina, and is subjected to heat treatment in steam.

7. The catalyst according to claim 3, which comprises a mixture of (a) a steam-heat-treated mixture of a zinc component and alumina and (b) zeolite.

8. The catalyst according to claim 3, which comprises zinc aluminate and zinc oxide.

9. The catalyst according to claim 8, wherein the content of zinc aluminate is from 8.2 to 50% by weight and the content of zinc oxide is from 1.2 to 20% by weight.

10. A process for the preparation of an aromatic hydrocarbon from a light hydrocarbon comprising either or both of an olefin and/or a paraffin, which comprises the step of using a high silica content zeolite-based catalyst which satisfies the following requirements (1), (2), (3) and (4):

(1) the zeolite constituting said zeolite-based catalyst has an $SiO_2/Al_2O_3$ molar ratio of from 20 to 200;

(2) the zeolite constituting said zeolite-based catalyst has a primary particle diameter of from 0.3 to 3 $\mu$m;

(3) when said zeolite-based catalyst is converted into H type, the H type zeolite-based catalyst has a ratio of the number of surface acid sites to the total number of acid sites is from 0.03 to 0.15; and (4) said zeolite-based catalyst exhibits a pyridine-desorbed amount (B) as measured at a temperature of from 500° C. to 900° C. by a hot desorption method when converted into H type after being subjected to a steam treatment at an $H_2O$ partial pressure of 0.8 atm and a temperature of 650° C. for 5 hours, and a pyridine-desorbed amount (A) as measured at a temperature of from 500° C. to 900° C. by a hot desorption method when converted into H type without said steam treatment, which amounts satisfy the following requirements:

$$\alpha \leq 1.6$$

$$\alpha = \left(\frac{1}{B^2} - \frac{1}{A^2}\right) \div 5 \times 10^5.$$

11. The process according to claim 10, wherein said high silica content zeolite-based catalyst provides a first order reaction rate constant of n-hexane of not less than 0.2 as determined at 500° C. and atmospheric pressure.

12. The process according to claim 10, wherein said high silica content zeolite-based catalyst comprises a mixture of zeolite and at least one member selected from the group consisting of the group VIII, Ib, IIb and IIIb metals and compounds thereof.

13. The process according to claim 12, wherein said high silica content zeolite-based catalyst has a pore volume of not less than 0.2 cc per g of the catalyst.

14. The process according to claim 12, wherein said high silica content zeolite-based catalyst comprises a mixture of zeolite, a zinc component and alumina.

15. The process according to claim 12, wherein said high silica content zeolite-based catalyst comprises a mixture of zeolite, a zinc component and alumina, and is subjected to heat treatment in steam.

16. The process according to claim 12, wherein said high silica content zeolite-based catalyst comprises a mixture of (a) a steam-heat-treated mixture of a zinc component and alumina and (b) zeolite.

17. The process according to claim 12, wherein said high silica content zeolite-based catalyst comprises zinc aluminate and zinc oxide.

18. The catalyst according to claim 17, wherein the content of zinc aluminate is from 8.2 to 50% by weight and the content of zinc oxide is from 1.2 to 20% by weight.

* * * * *